(12) United States Patent
Greifeneder et al.

(10) Patent No.: US 9,356,842 B2
(45) Date of Patent: May 31, 2016

(54) METHOD AND SYSTEM FOR BROWSER BASED, NON-INTRUSIVE MEASURING OF END-USER PERCEIVED PERFORMANCE OF INDIVIDUAL THIRD PARTY RESOURCE REQUESTS

(71) Applicant: Compuware Corporation, Detroit, MI (US)

(72) Inventors: Bernd Greifeneder, Linz (AT); Helmut Spiegl, Linz (AT); Bernhard Lackner, Linz (AT)

(73) Assignee: Dynatrace LLC, Detroit, MI (US)

( * ) Notice: Subject to any disclaimer, the term of this patent is extended or adjusted under 35 U.S.C. 154(b) by 201 days.

(21) Appl. No.: 14/056,016

(22) Filed: Oct. 17, 2013

(65) Prior Publication Data
US 2014/0136693 A1    May 15, 2014

Related U.S. Application Data

(60) Provisional application No. 61/724,391, filed on Nov. 9, 2012.

(51) Int. Cl.
| | |
|---|---|
| *H04L 12/26* | (2006.01) |
| *H04L 12/24* | (2006.01) |
| *H04L 29/12* | (2006.01) |
| *H04L 29/08* | (2006.01) |

(52) U.S. Cl.
CPC ........ *H04L 41/5067* (2013.01); *H04L 61/1505* (2013.01); *H04L 67/10* (2013.01); *H04L 67/20* (2013.01); *H04L 67/02* (2013.01); *H04L 67/22* (2013.01)

(58) Field of Classification Search
CPC .. G06Q 30/02; G06F 17/30896; H04L 51/00; H04L 51/18; H04L 67/02; H04L 41/5067; H04L 51/1505; H04L 67/10
See application file for complete search history.

(56) References Cited

U.S. PATENT DOCUMENTS

| | | | |
|---|---|---|---|
| 7,818,208 B1 * | 10/2010 | Veach | 705/14.49 |
| 2002/0107918 A1 * | 8/2002 | Shaffer et al. | 709/203 |
| 2005/0204047 A1 * | 9/2005 | Mitchell | H04L 67/02 709/228 |
| 2007/0022327 A1 * | 1/2007 | Otsuka et al. | 714/47 |
| 2008/0114875 A1 * | 5/2008 | Anastas et al. | 709/224 |
| 2009/0037517 A1 * | 2/2009 | Frei | G06F 17/30893 709/202 |
| 2009/0049429 A1 | 2/2009 | Greifeneder | |
| 2009/0271713 A1 * | 10/2009 | Stull et al. | 715/753 |
| 2011/0179356 A1 * | 7/2011 | Bassali et al. | 715/704 |
| 2012/0239504 A1 * | 9/2012 | Curlander et al. | 705/14.66 |
| 2013/0185643 A1 | 7/2013 | Greifeneder | |

\* cited by examiner

*Primary Examiner* — Chirag R Patel
(74) *Attorney, Agent, or Firm* — Harness, Dickey & Pierce, P.L.C.

(57) ABSTRACT

A performance management system is provided that measures end user performance in a distributed computing environment. The system detects DOM updates caused by browser side activities, and identifies resource load requests introduced by a DOM update that request resource from third party sources. For such resource load requests, resource sensors are installed which detect the point in time when loading the resource was finished. This allows to measure load time for individual resource load requests requesting third party resources, and to assign the tracing and performance monitoring data describing those resource load requests to the tracing and performance monitoring data describing the browser side transaction execution that caused the third party resource loads.

35 Claims, 22 Drawing Sheets

Figure 1:
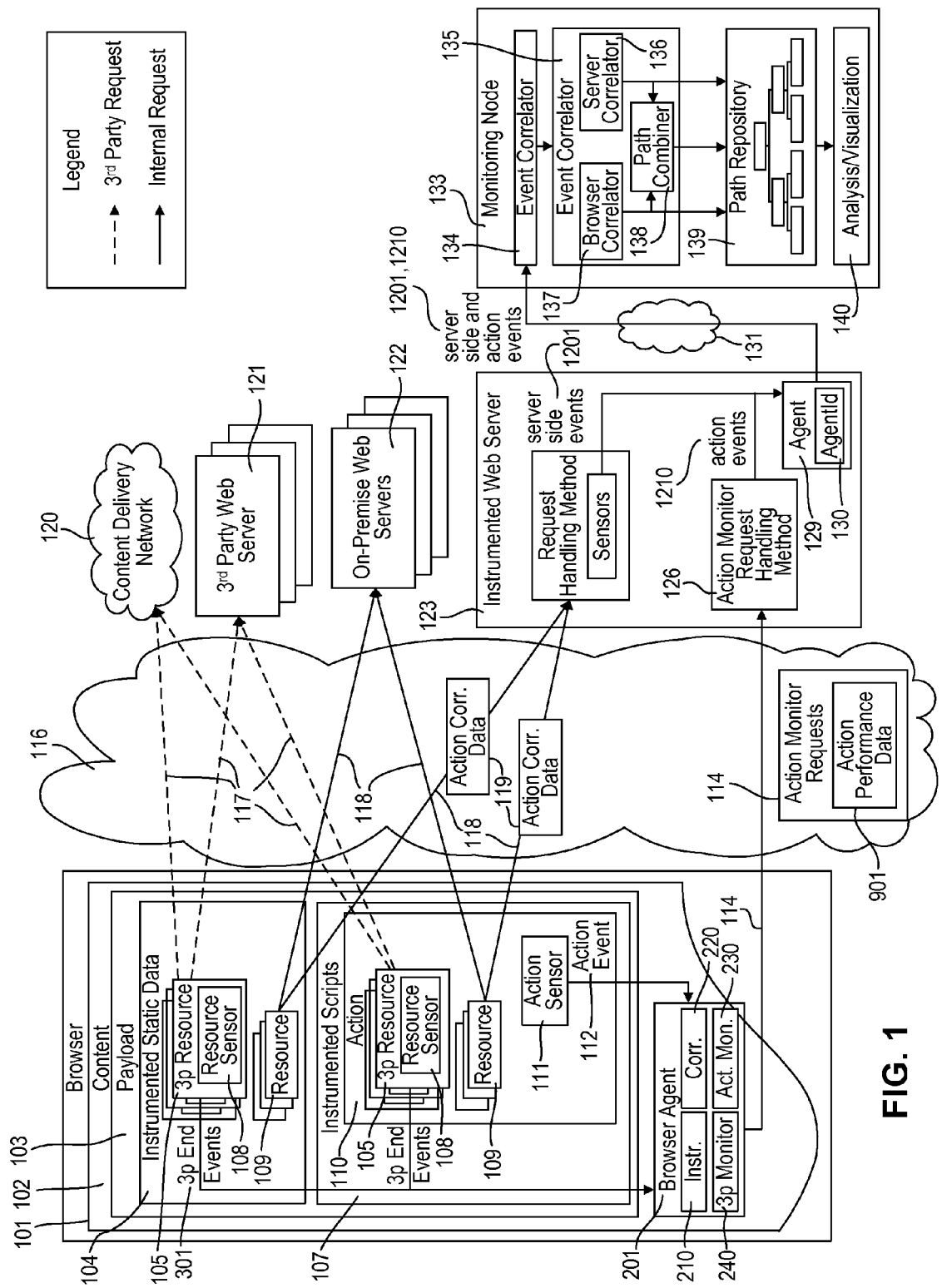

METHOD AND SYSTEM FOR BROWSER BASED, NON-INTRUSIVE MEASURING OF END-USER PERCEIVED PERFORMANCE OF INDIVIDUAL THIRD PARTY RESOURCE REQUESTS

CROSS-REFERENCE TO RELATED APPLICATIONS

This application claims the benefit of U.S. Provisional Application No. 61/724,391, filed on Nov. 9, 2012. The entire disclosure of the above application is incorporated herein by reference.

FIELD

The present disclosure relates to a method and system for browser based, non-intrusive measuring of end-user perceived performance of individual third party resource requests.

BACKGROUND

Web browser based applications typically load resources like image, script or sound files to the browser to render user interfaces. The demand for more attractive and interactive user interfaces increased amount and size of those resources, which makes the time required for loading those resources crucial for the overall application performance.

For resources which are hosted by the application provider itself and which are requested from a server that is controlled by the application provider, performance measures describing the load performance of requested resources may be obtained at the server side.

A server side performance measurement is not possible for resources requested from other sources like content delivery networks (CDNs) or servers not controlled by the application provider.

Current solutions use geographically distributed networks of virtual user agents, which mimic browser based user activity by automatically sending requests to a monitored application. Those requests may e.g. be controlled by a script and simulate typical user activity like e.g. searching for a product.

Timing data to receive the response and to render the user interface may be measured by those virtual user agents. This timing data may also contain performance data related to loading of third party resources.

However, those virtual user agent based solutions show some shortcomings. The behavior of those virtual user agents has to be tailored to the monitored application in a way to send requests expected by the application. This results in manual configuration and customization work to initially adapt the virtual user agents to the monitored application in form of e.g. scripts that control the virtual user agents. In case of an update of the monitored application which changes the expected requests, also those virtual user agent scripts must be updated.

Virtual user agents simulate user interactions with the monitored application by e.g. sending requests to the monitored application and interpreting the received responses. Various performance measures, including measures describing the loading of third party resources are acquired by the virtual user agent during request sending, receiving and interpreting the response.

As virtual user agents only create and measure synthetic user interactions instead of measuring performance data of real user interactions, they can only provide performance monitoring data with the quality of random sample data.

Additionally, as those virtual agents also generate load on the monitored application, it is desired to keep the number of requests generated by virtual users low. This reduces the number of samples available for the performance estimation, which decreases the accuracy and quality of the acquired measurements.

Virtual user agents cannot, or can only in a restricted way, be used to monitor the performance of user interactions that trigger "real" transactions, like an actual purchase of a specific product or authorizing a credit card transaction. In case a virtual user would e.g. create purchase requests for arbitrary products for performance measurements, it would be extremely difficult to filter out those requests in the back office processing to avoid processing them like normal purchases.

Consequently, monitoring methods and systems that measure the performance of third party resource requests are required that can be applied to all types of user interactions, which do not required application specific tailoring of the monitoring system and which provide measurements that describe third party resource load performance as perceived by the real users.

Content delivery networks (CDNs) are networks of regionally distributed servers, which may be used by content providers to geographically distribute their content and to provide location independent, high performance access to the content. However, such content delivery networks may show location based deviations in accessibility and performance of the provided content, which makes a monitoring system desirable which allows detection and measurement of such location based deviations.

This section provides background information related to the present disclosure which is not necessarily prior art.

SUMMARY

This section provides a general summary of the disclosure, and is not a comprehensive disclosure of its full scope or all of its features.

A system and method is disclosed which allows non-intrusive application-independent, and web browser based monitoring of the performance of third party resource load requests caused by monitored end-user triggered activities. The disclosed system may be applied to applications in a generic way, without the need to perform application specific configurations of the monitoring system.

Embodiments of the disclosure may detect resource load requests performed by individual web browsers and distinguish between internal and third party requests. Those embodiments may measure the time between sending a third party resource request and receiving the corresponding response, and store corresponding correlation and measurement data in a repository at a browser agent.

Other embodiments may also track the success state of a third party load request and store this success state in a repository at a browser agent.

Some embodiments detect user triggered activities on the browser, and only measure the performance of third party resource requests caused by such user triggered activities. Those embodiments may also tag third party measurement data with correlation information that allows to determine the user triggered activity causing the third party resource load. Some variants of those embodiments may provide transaction tracing and performance data describing end-to-end transactions containing web browser based and web server/backend side activities, and the gathered and tagged third party request performance data may be used to enrich end-to-end transaction tracing data with relevant third party resource load performance data.

Yet other embodiments may only provide individual third party load performance data for particular third party requests, and statistical performance data for the remaining third party requests. Those embodiments may e.g. provide individual load performance data for a defined number of requests with worst performance, and statistical data per third party request source (e.g. URL domain) for all requests. This approach provides detailed data for those third party resource requests with highest performance impact additionally to a performance overview per third party resource provider.

Other embodiments may use server side injection of monitoring code in form of a browser agent into content created by the application server. This monitoring code may be transferred with the created content to the web browser. This monitoring code may on the web browser side be used to detect third party resource load requests and to add instrumentation code in form of resource sensors to measure third party resource load times. Variants of these embodiments may use browser side resource load timing measurement services to get performance data describing third party resource loading.

Again other embodiments may determine the location of the web browser performing third party resource requests, tag third party resource measurement data or enclosing tracing data with location information, and use location information together with per domain statistical third party resource loading performance data to detect location dependent deviations of third party resource request performance.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1: shows a system overview containing a web browser currently displaying instrumented content of the monitored application, provided by an instrumented web server. The content of the web browser also includes third party resource references, referring resources provided by third party web servers or content delivery networks. The third party resource references are instrumented with resource sensors that report measurements to a browser agent injected to the browser content. The measurements are forwarded to a monitoring node, for storage and analysis.

Figure 2:
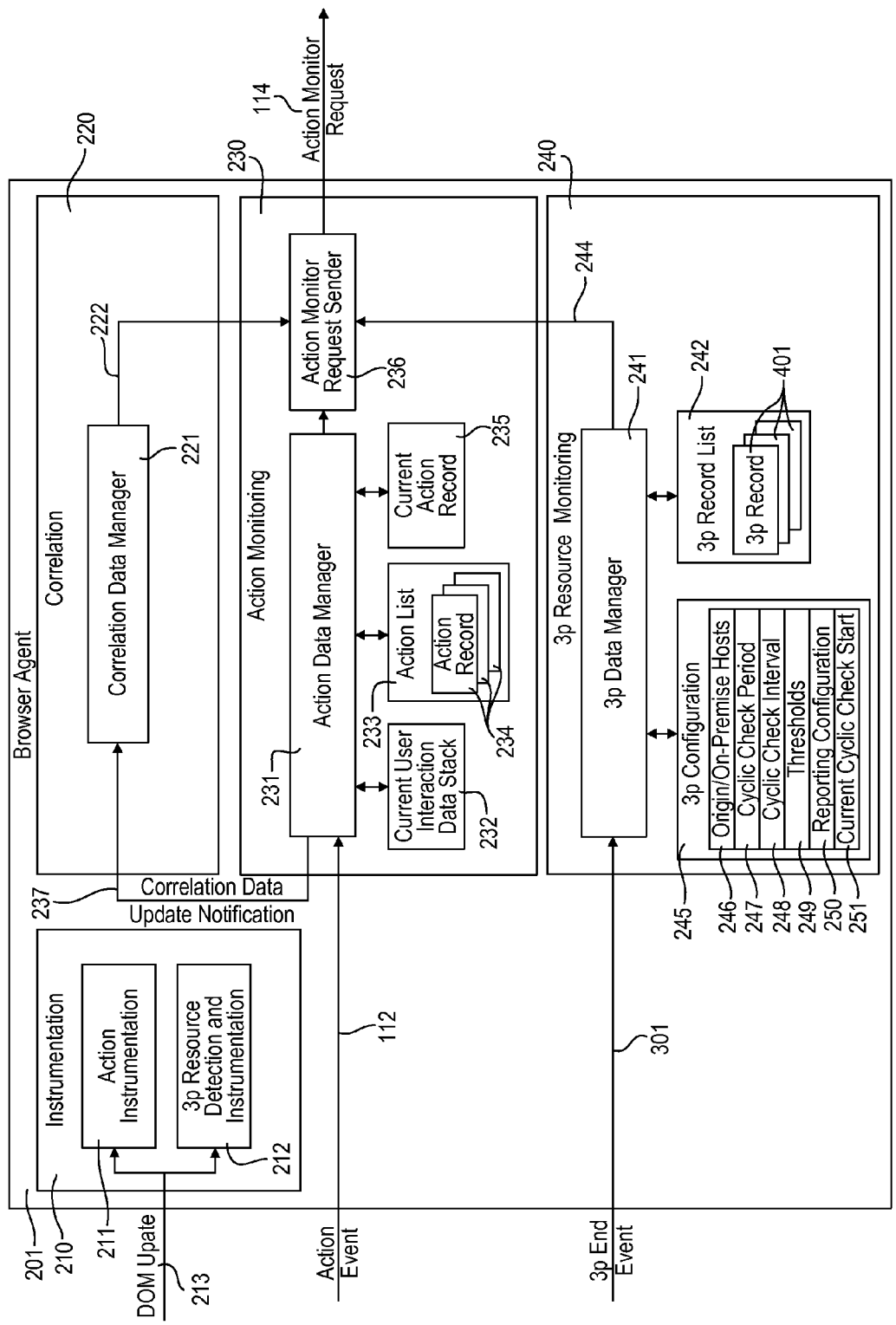

FIG. 2: provides a more detailed view of a browser agent which is injected into browser content. It contains an instrumentation unit, which analyses the browser content and places sensors to detect user interactions and to measure performance data of performed browser side activities, including loading of requested third party resources, a correlation unit, which provides correlation data to identify browser instance, content view instance and a specific executed action on the content view instance. The correlation data may be used to tag measurement data provided by instrumented action executions and third party resource requests. The browser agent also contains an action monitoring unit which maintains a list of action execution records describing monitored action executions. It also contains an action monitor request sender which sends measurement data via action monitor requests. Additionally, it contains a third party resource monitoring unit (3p resource monitor) which maintains a list of third party resource request performance data records in form of third party records (3p records).

Figure 3:
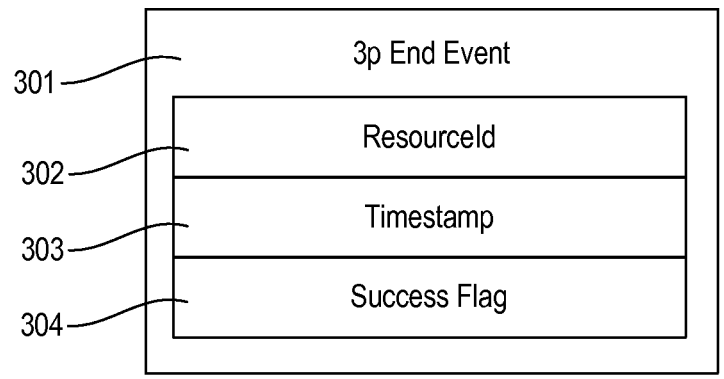

FIG. 3: depicts a third party end event (3p end event) which may be used to describe the point in time when loading of a specific requested third party resource was finished. Additionally, it may be used to describe a success status of the finished load request.

Figure 4:
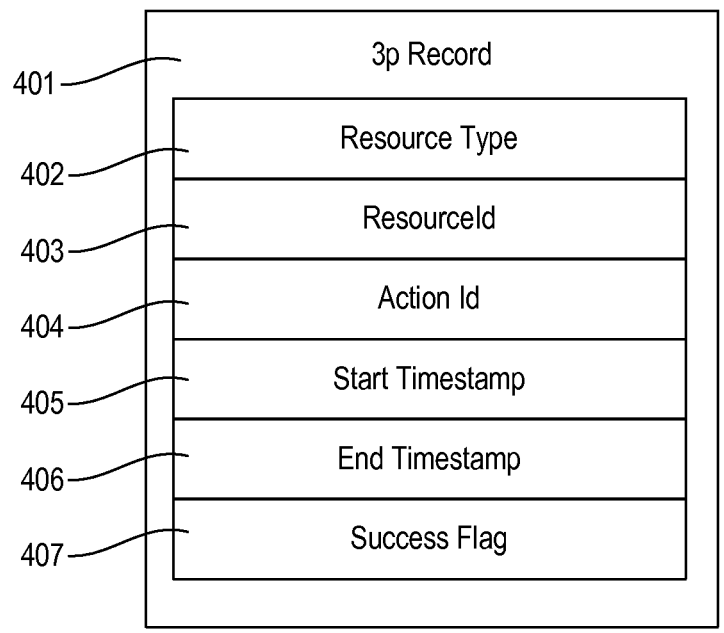

FIG. 4: shows a third party record (3p record) which may be used to hold data identifying a specific third party resource request, data to identify the action execution causing the third party resource request, timing data describing the performance of the third party request and a success indicator describing the success state of the monitored third party request.

Figure 5:
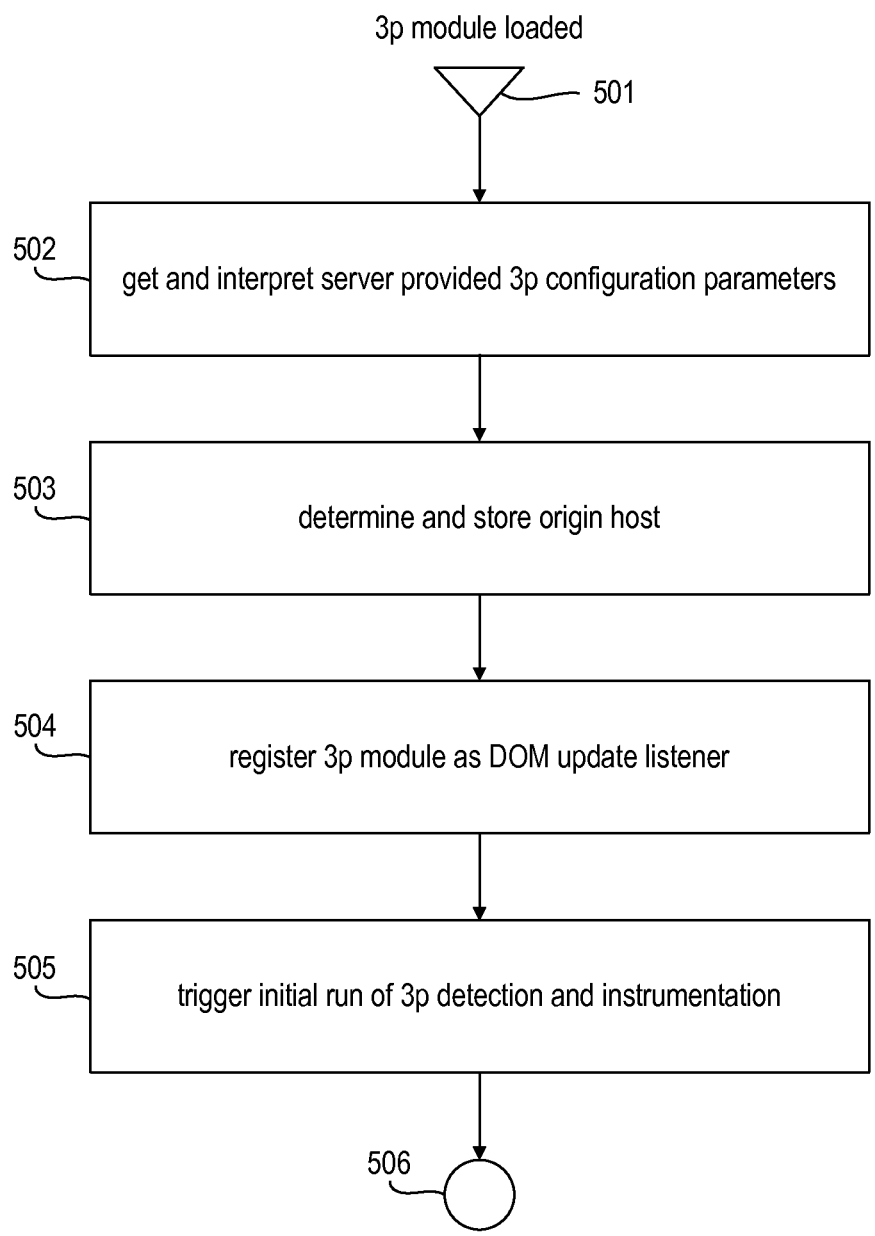

FIG. 5: shows the process of initializing the third party module (3p module).

Figure 6:
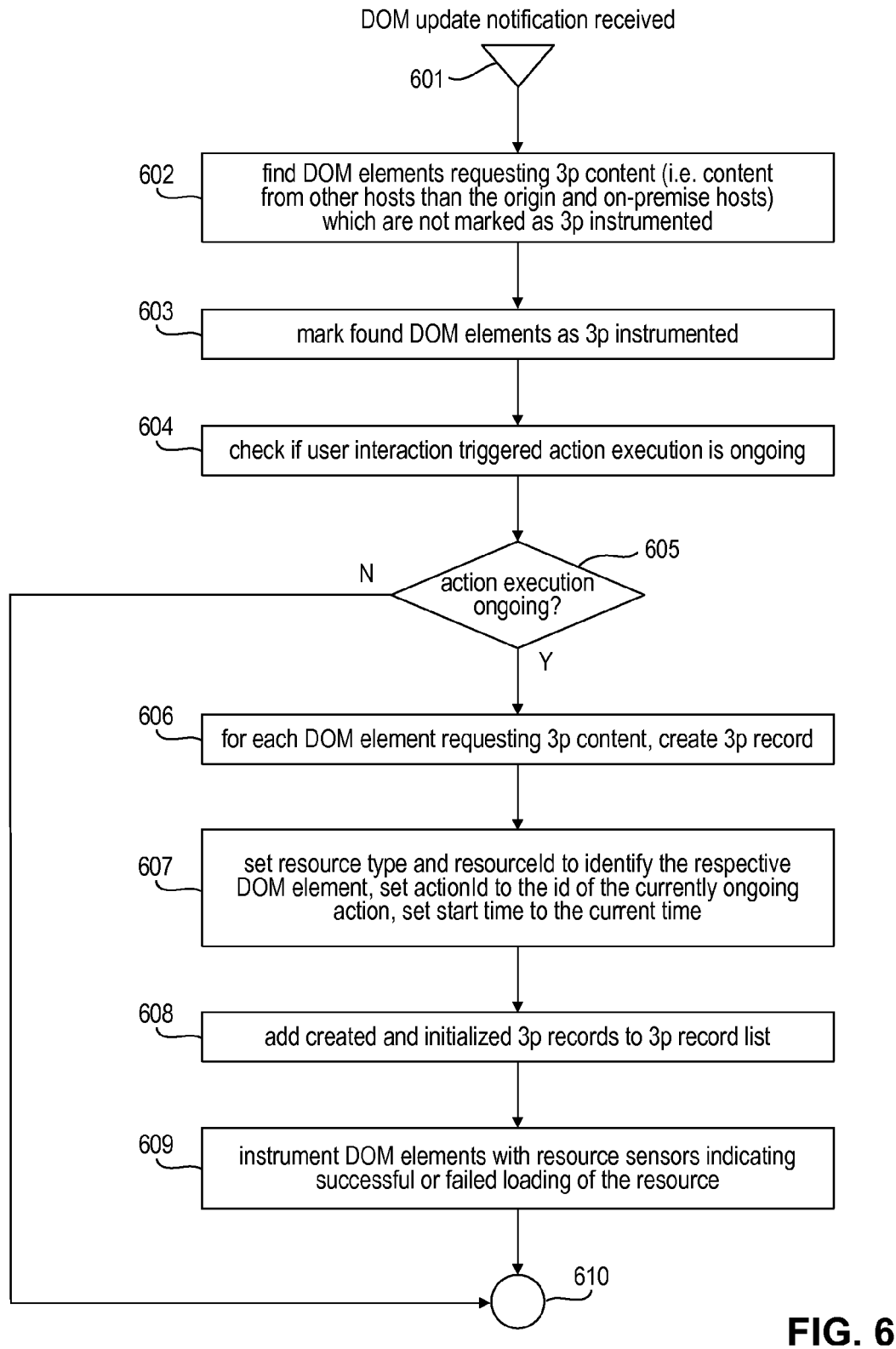

FIG. 6: describes the handling of DOM update notification received by the browser agent, to detect and instrument third party requests added by the notified DOM update.

Figure 6A:
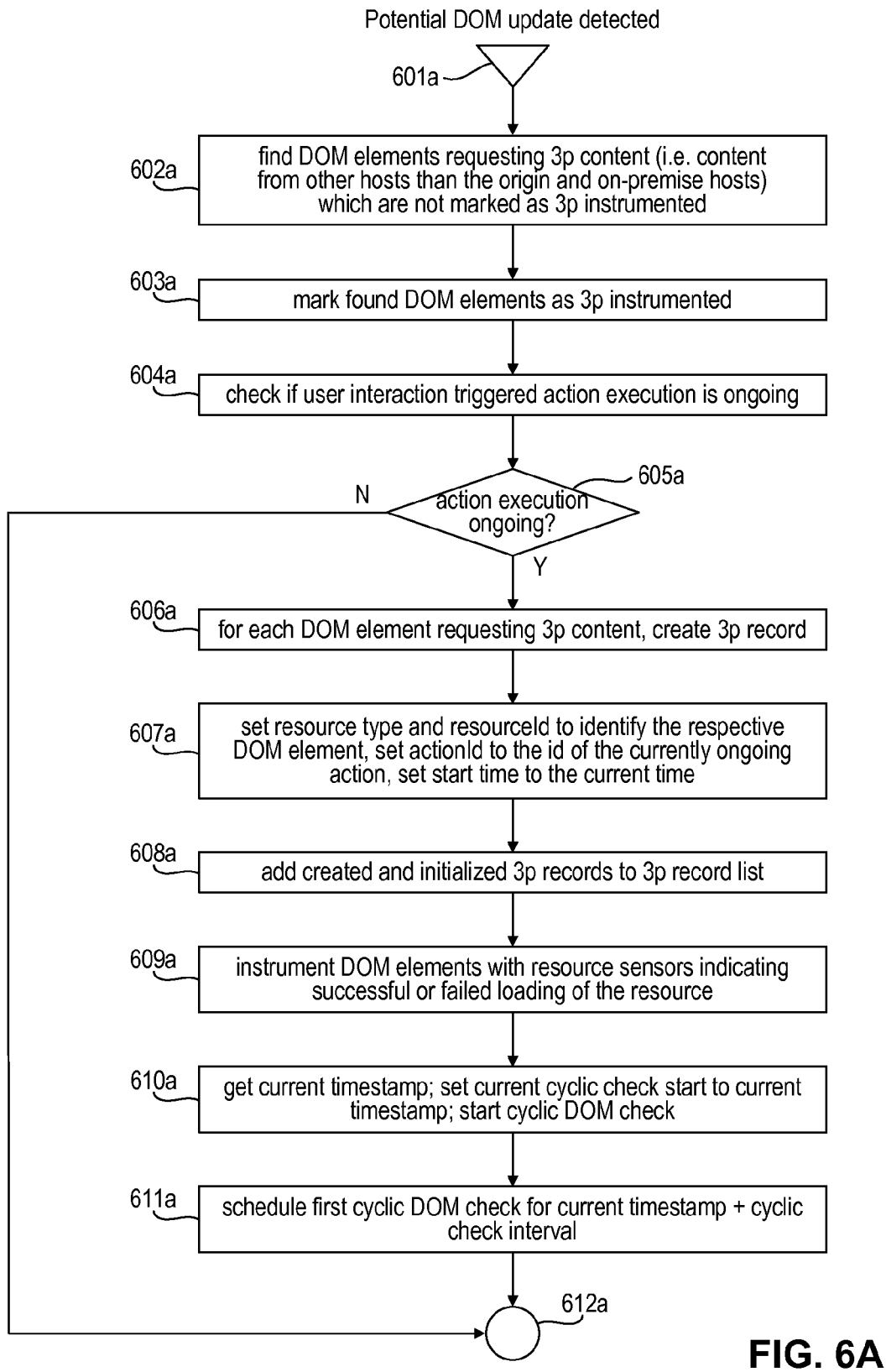
Figure 6B:
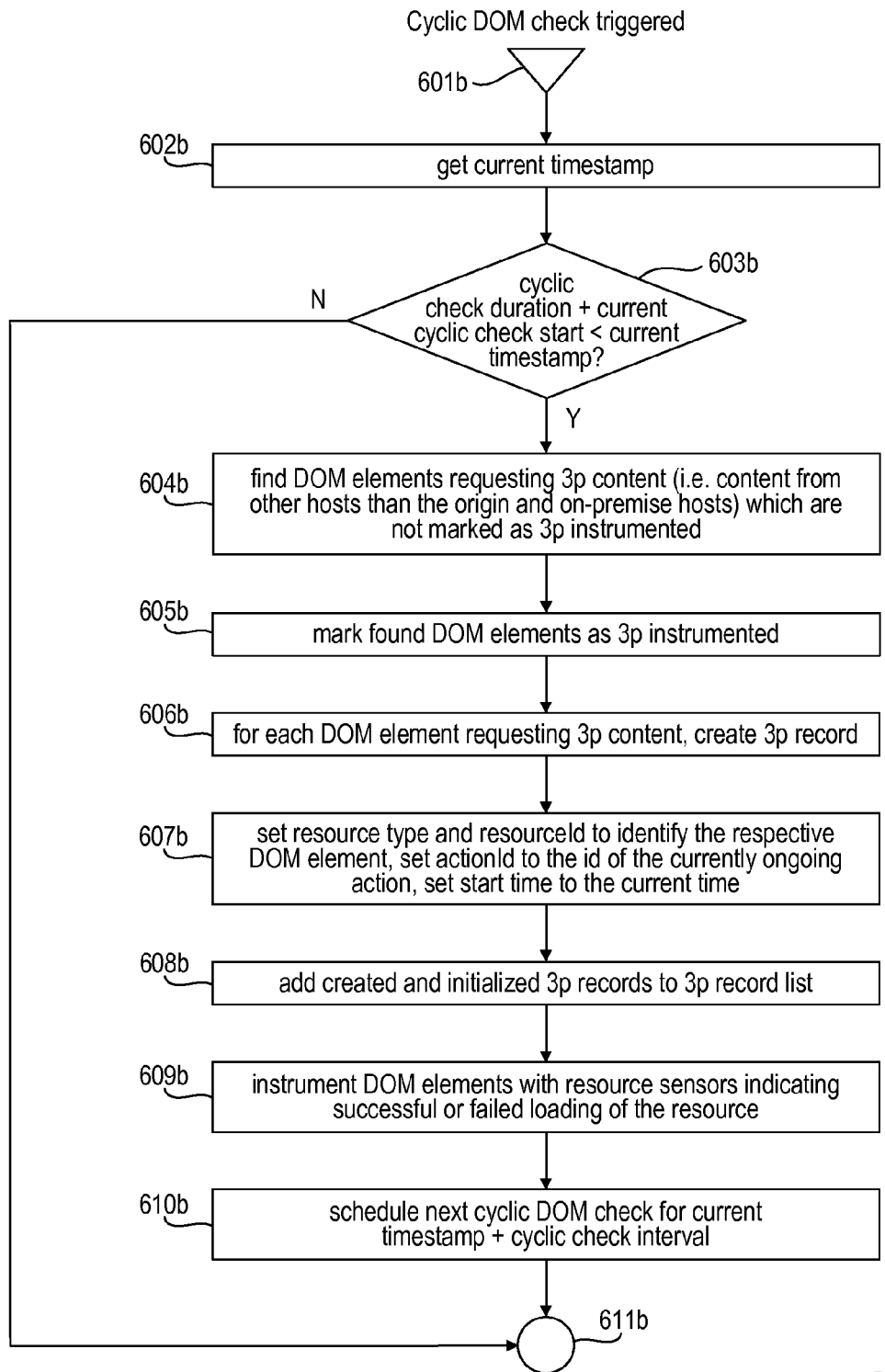

FIGS. 6a and 6b: describe an alternative process to handle potential DOM updates on browser environments providing no DOM update notification mechanisms. FIG. 6a describes the handling of a detected potential DOM update and FIG. 6b shows a process that cyclically checks the DOM for new added third party requests after a detected potential DOM update.

Figure 7:
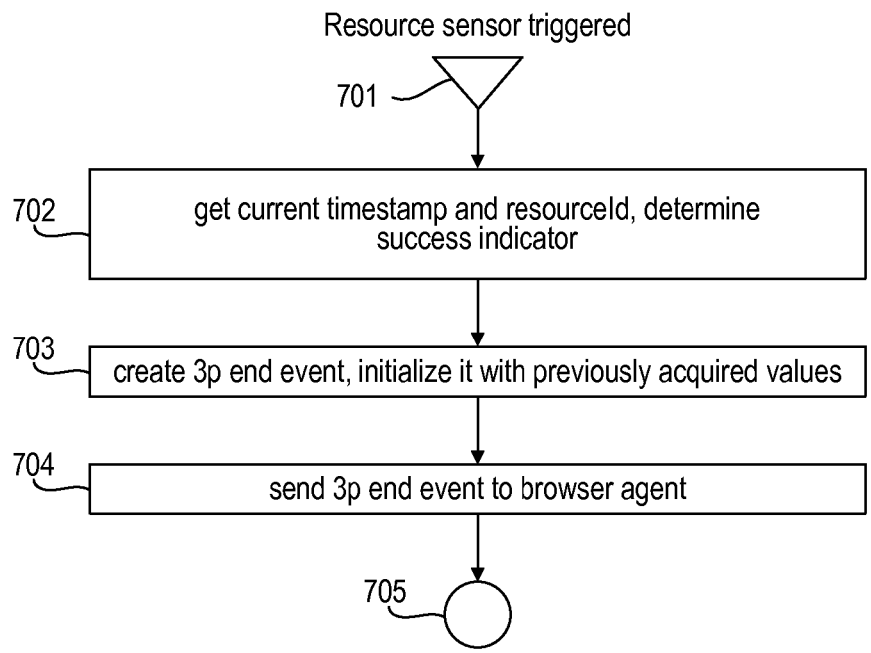

FIG. 7: shows the execution of a resource sensor, which creates, initializes and sends a third party end event.

Figure 8:
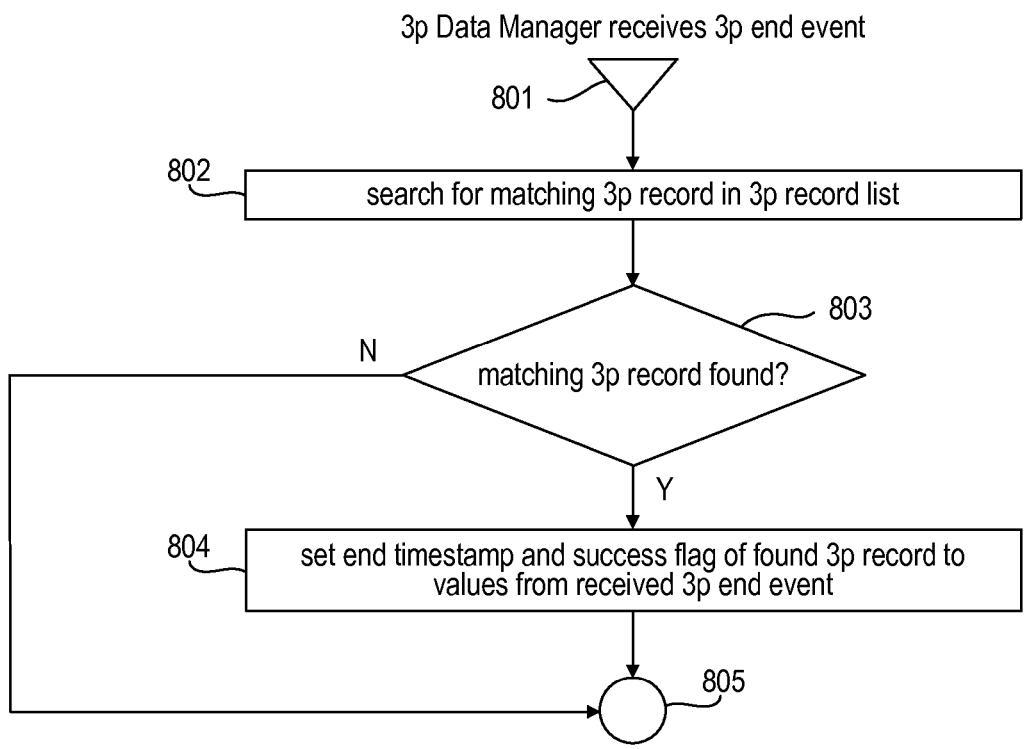

FIG. 8: depicts the processing of an incoming third party end event by the third party data manager.

FIGS. 9A-D: show data records which may be used to compose action performance data which is sent as part of an action monitor request from a browser agent to an instrumented web server. An action performance data record contains correlation and identification data to identify a browser instance and a content view instance, action execution performance data and third party resource load performance data. Third party performance data is provided in form of individual third party performance data entries, describing single, individual third party requests, and per domain performance data entries, containing statistical performance data describing the performance behavior of individual domains providing third party resources.

Figure 10:
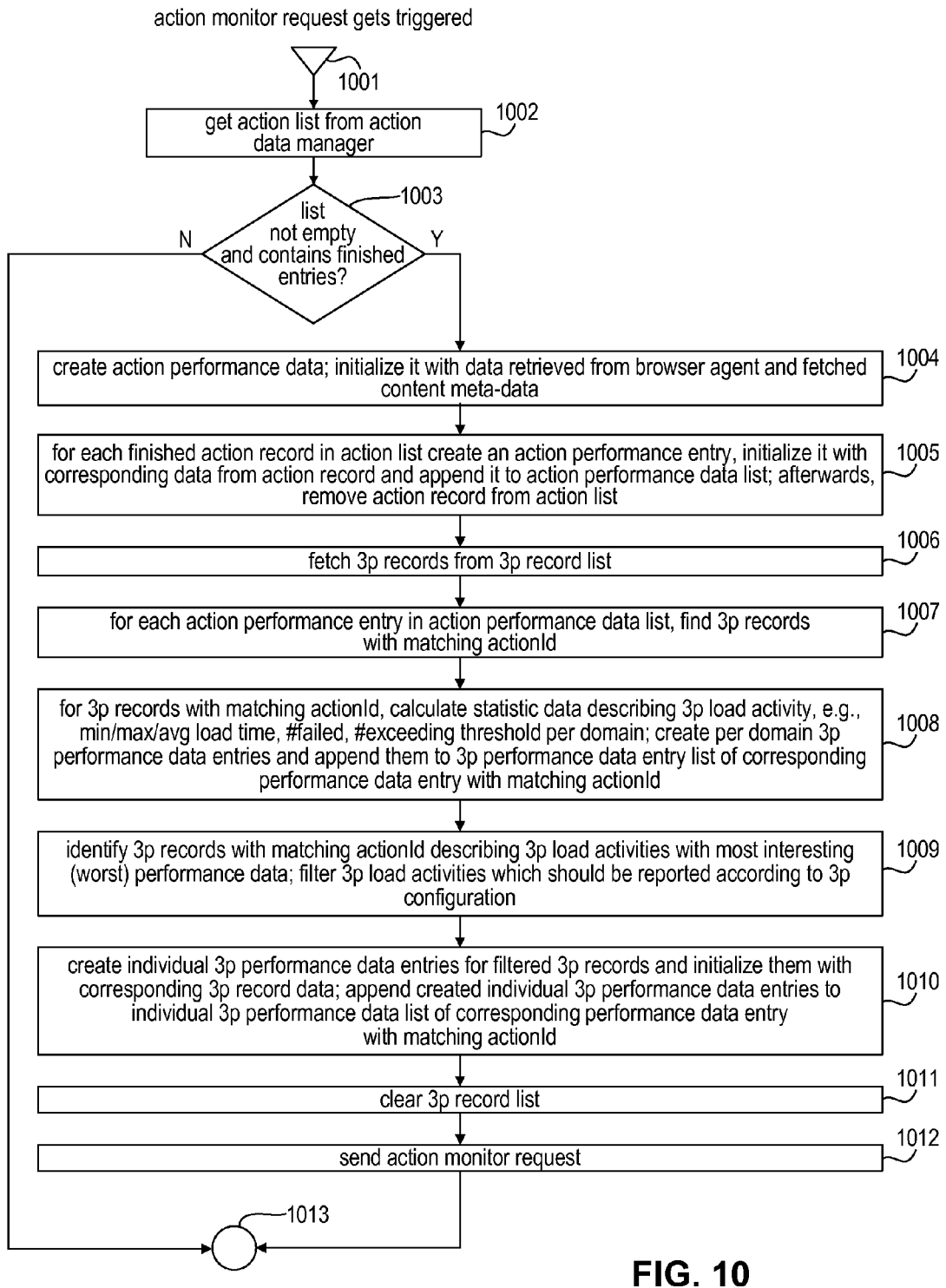

FIG. 10: shows the process of creating an action performance data record out of action execution performance data and third party monitoring data and sending the create action performance data record to an instrumented web server as part of an action monitor request.

Figure 10A:
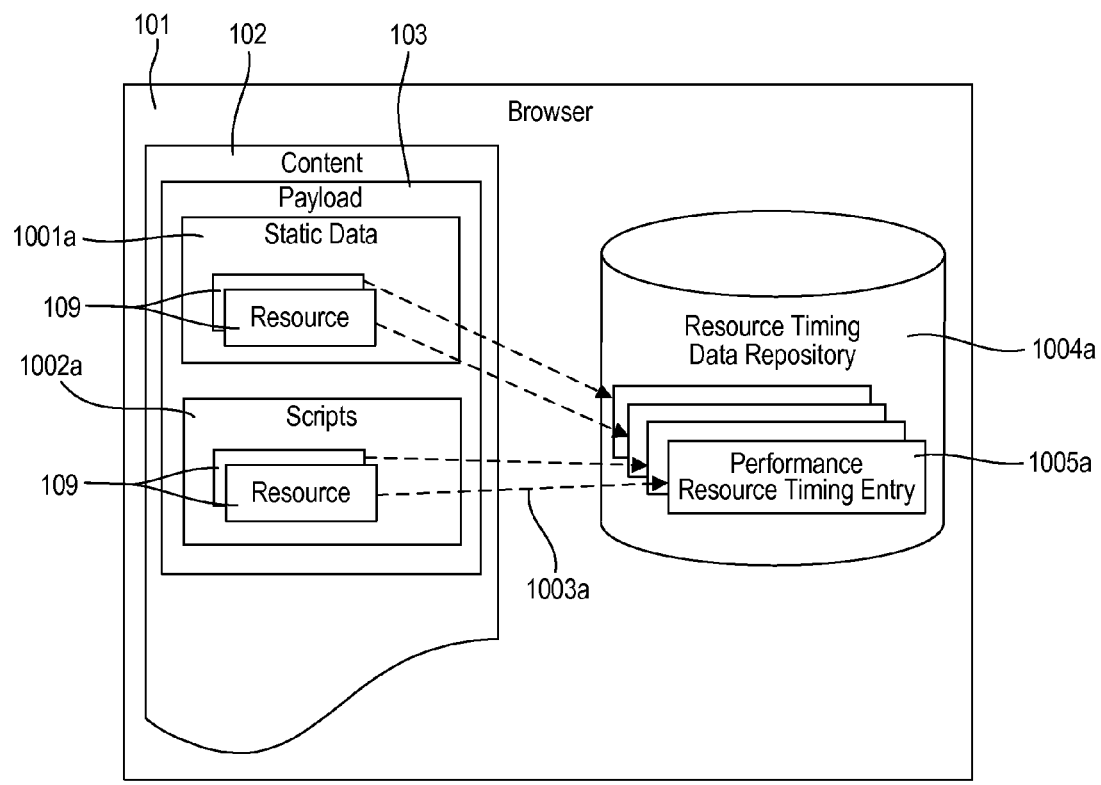
Figure 10B:
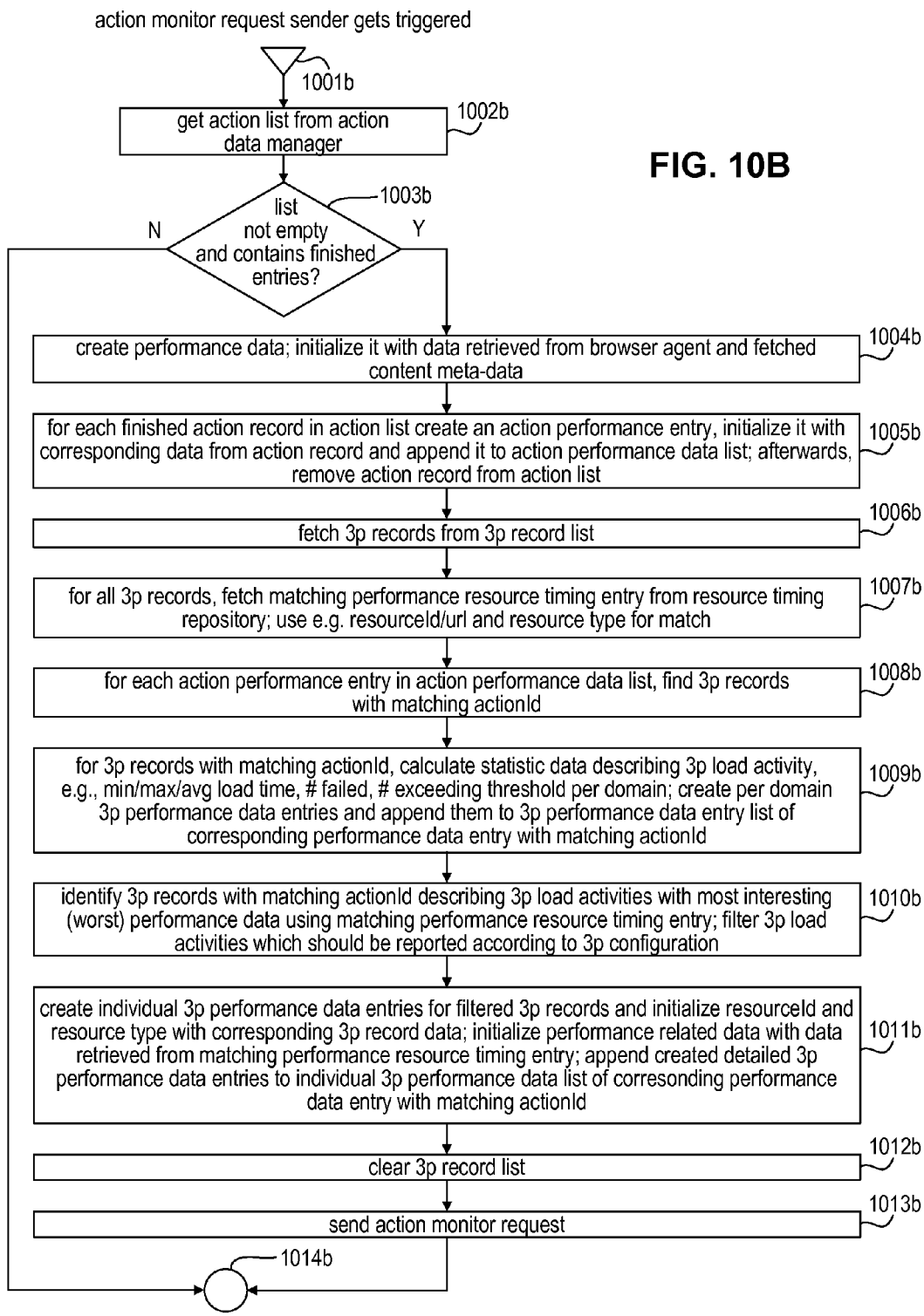

FIGS. 10a and 10b: show an alternative process to create an action performance data record by using the resource timing data provided by the browser according to the W3C resource timing standard. FIG. 10a shows an overview of the browser provided resource timing data functionality, and FIG. 10b shows how this resource timing data may be used to create and initialize an action performance data record.

Figure 11:
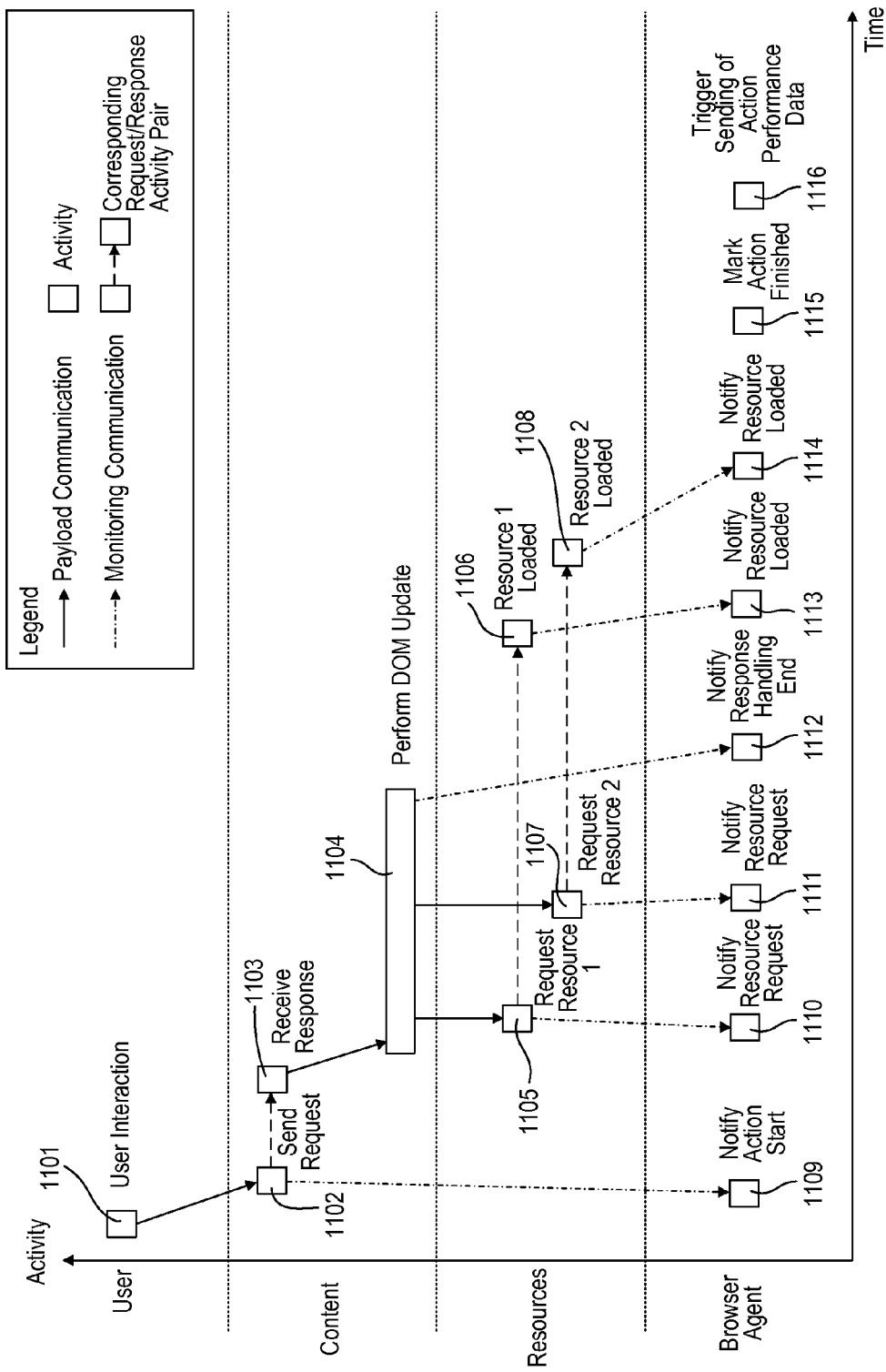

FIG. 11: describes dependencies and temporal sequence of monitored activities triggered by the user of the application, monitored resource load requests caused by those activities and agent activities to register and measure monitored activities and resource load requests and activities to send gathered monitoring data to an external entity for analysis.

Figure 12A:
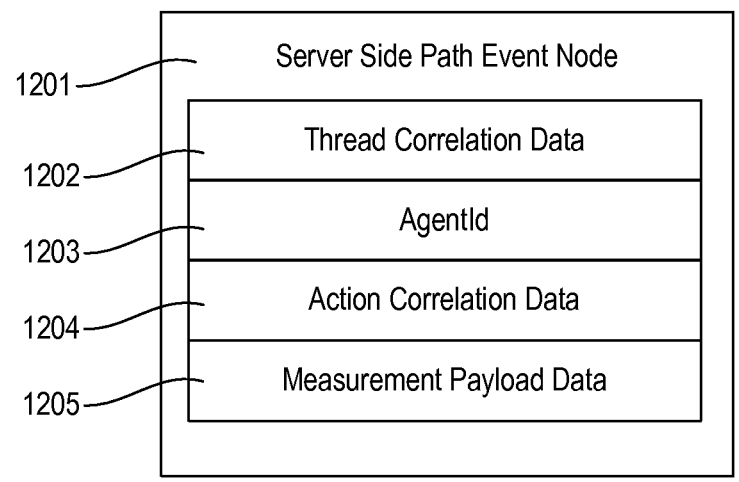
Figure 12B:
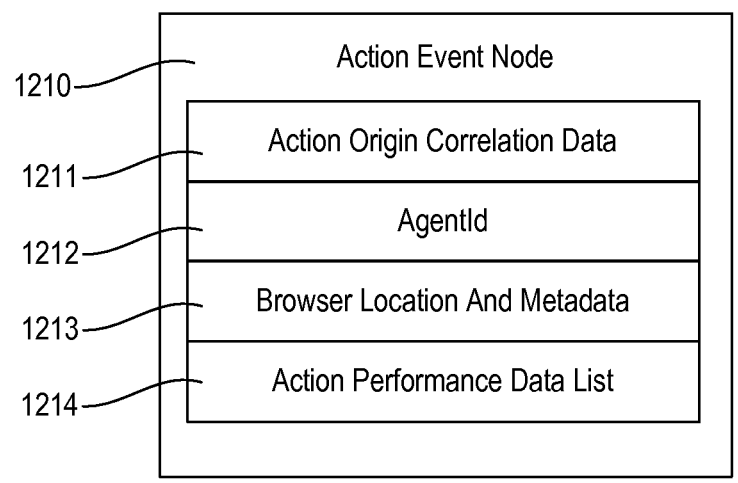

FIGS. 12A-B: depict simplified event nodes, which are used to transport partial transaction monitoring and correlation data to a monitoring node. FIG. 12a shows a server side event node, which provides partial monitoring and correlation data describing server side transaction executions and FIG. 12b presents an action event node which contains correlation and monitoring data describing browser side activities. The provided monitoring and tracing data also contains data describing third party resource load requests caused by monitored browser side activities.

Figure 13:
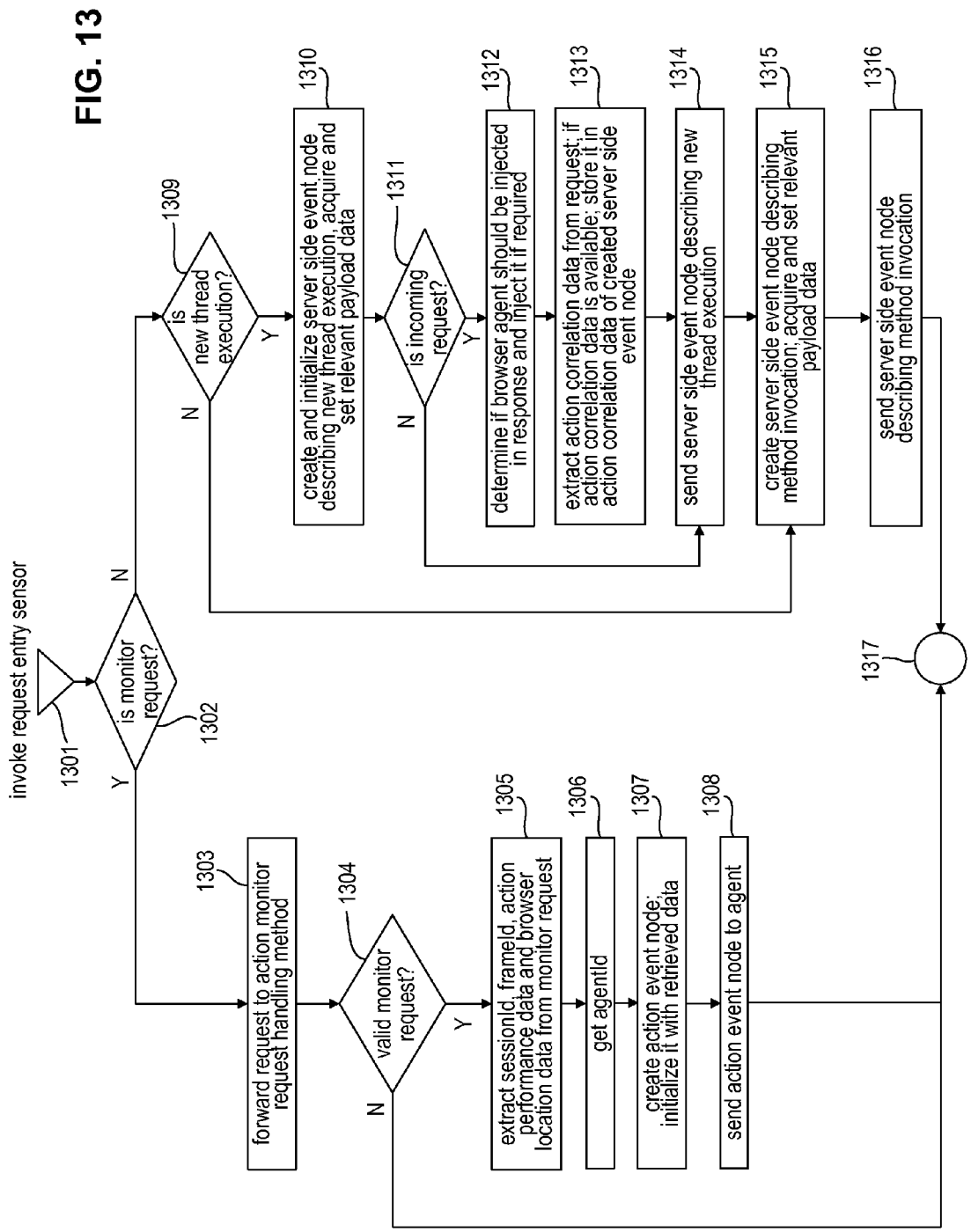

FIG. 13: describes the execution of a request entry sensor, which is instrumented into request handling methods of an instrumented web server. The request entry sensor distinguishes between payload requests that are part of monitored transactions, and monitor requests, which are sent by the browser agent to transfer recorded browser side action correlation and monitoring data from the browser to the monitoring node for correlation and analysis.

FIGS. 14 A-D: show simplified path nodes, which are used to describe end-to-end transaction tracing and monitoring data. FIG. 14a shows an action path node, which holds action execution performance data and correlation data to identify the browser instance on which the monitored action was executed. Additionally, it contains third party resource load data caused by the action execution in form of per third party domain statistics and individual third party performance records. It also includes references to data describing server side activities triggered by the action execution in form of server side path nodes. FIG. 14b shows a per domain third party path node, which holds correlation data to identify a specific third party domain, and statistical data describing the resource load performance for the specific domain. FIG. 14c shows an individual third party resource path node which contains correlation data to identify an individual resource load request together with corresponding performance data. Server side path nodes as described in FIG. 14d may be used to describe server side transaction executions. In case a monitored browser side action execution triggers server side transaction execution, the corresponding action path node and server side path node are linked by the correlation process performed by the event correlator.

Figure 15:
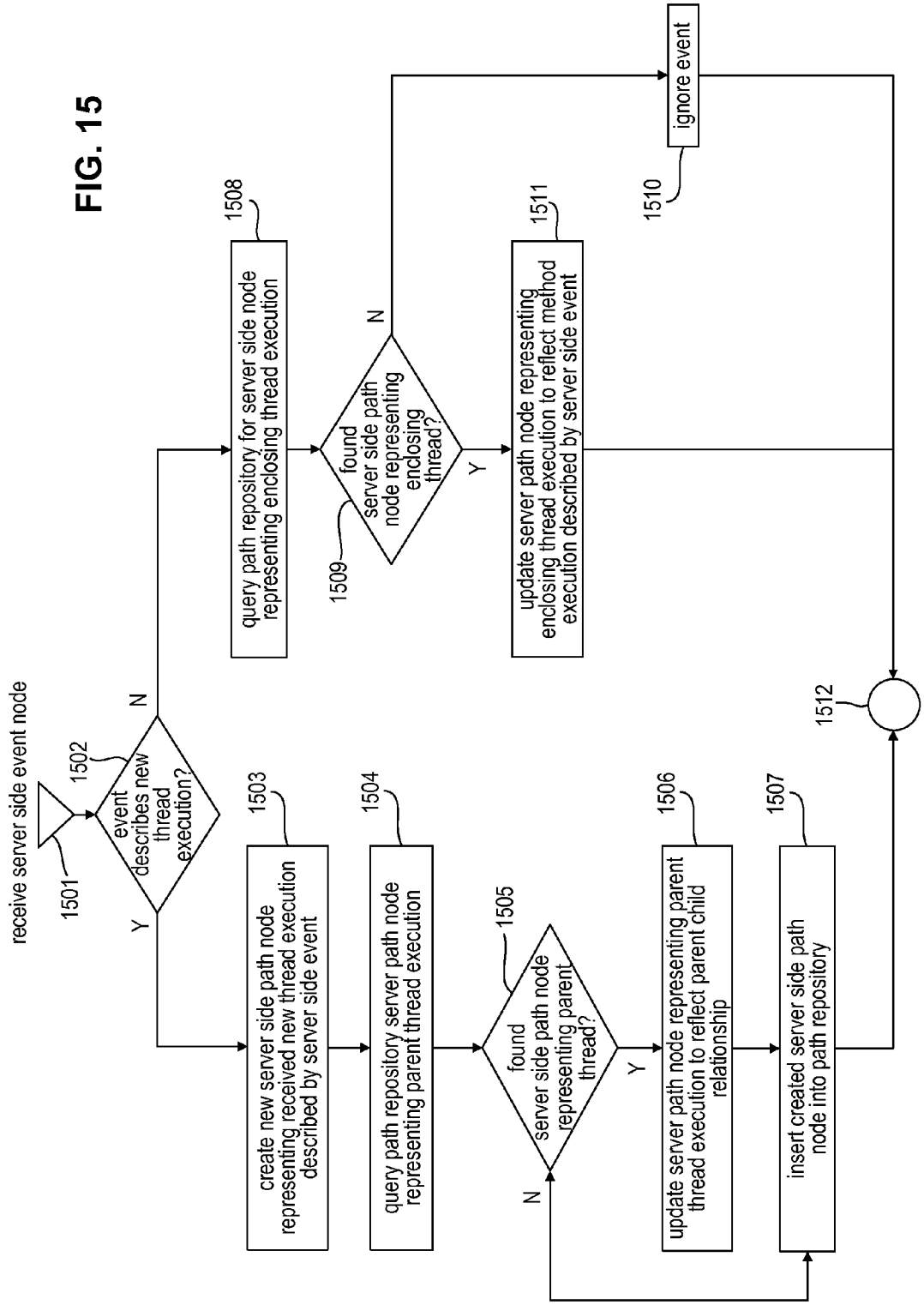

FIG. 15: shows the processing off an incoming server side event node by the server correlator. The server correlator creates a corresponding server side path node and links the created server side path node with existing server side path nodes according to received correlation data and inserts it into the path repository.

Figure 16:
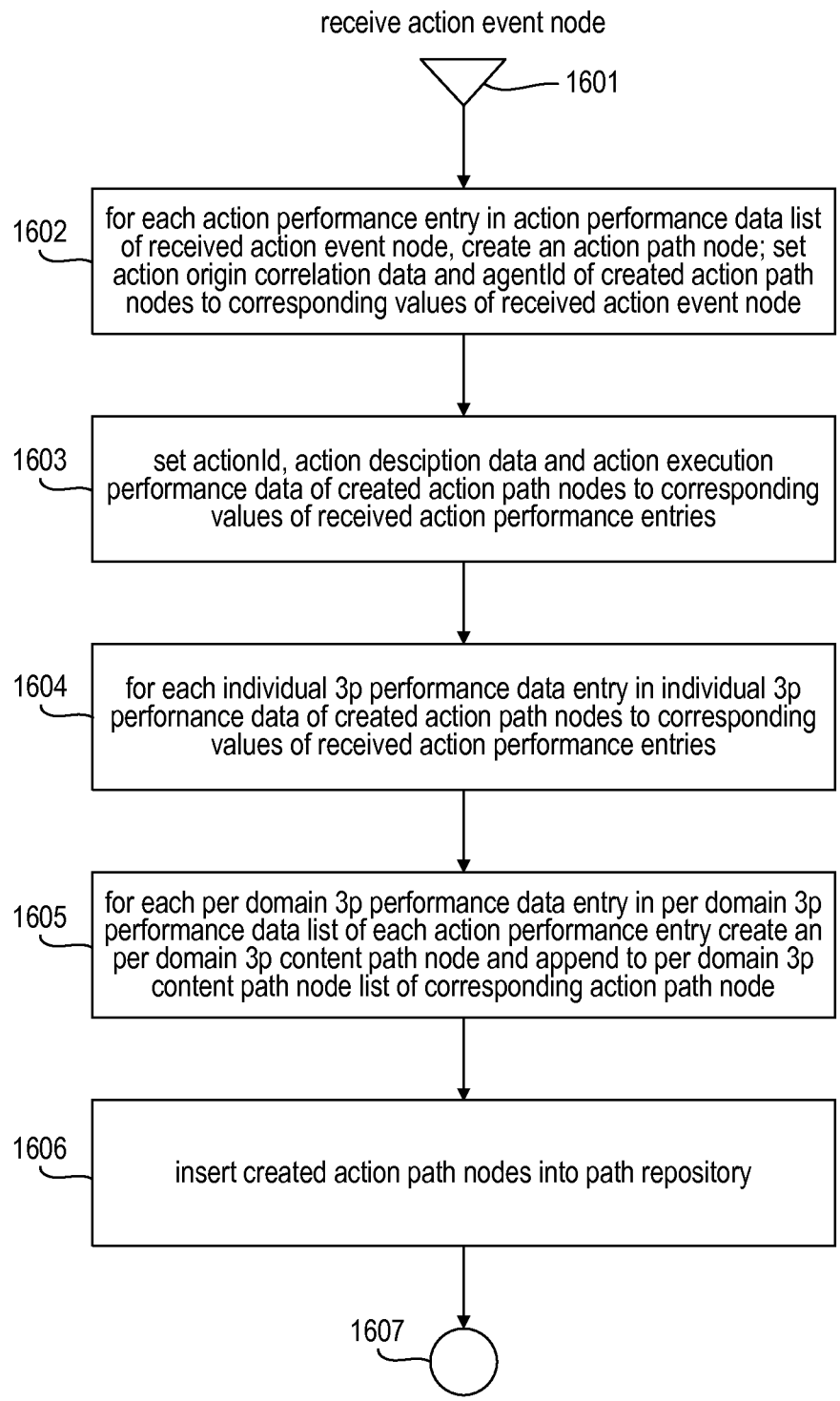

FIG. 16: shows the processing of incoming action event nodes by the browser correlator. The browser correlator creates corresponding action path nodes, corresponding per domain and individual third party resource path nodes and links the created third party resource path nodes with the corresponding action path node. The created action path nodes are inserted into the path repository.

Figure 17:
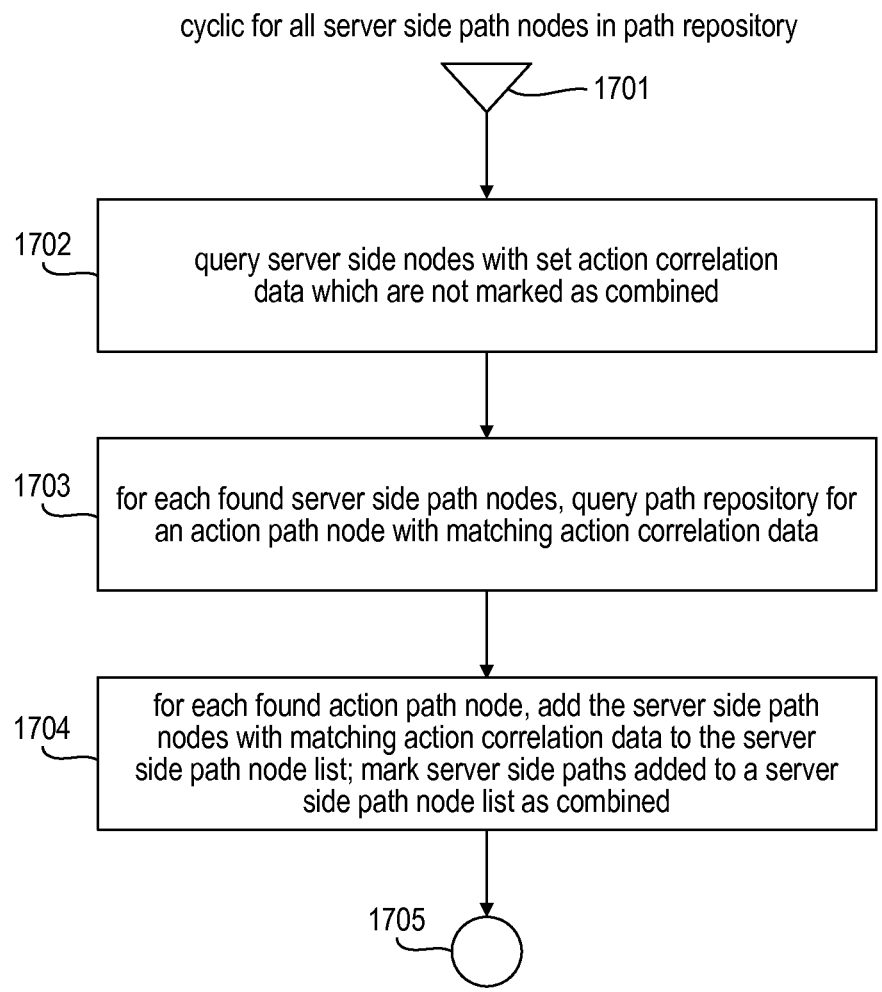

FIG. 17: depicts the path combination process as performed by the path combiner. The path combiner cyclically scans the path repository for action path nodes and server path nodes which match according to their correlation data and links matching action and server path nodes.

Figure 18A:
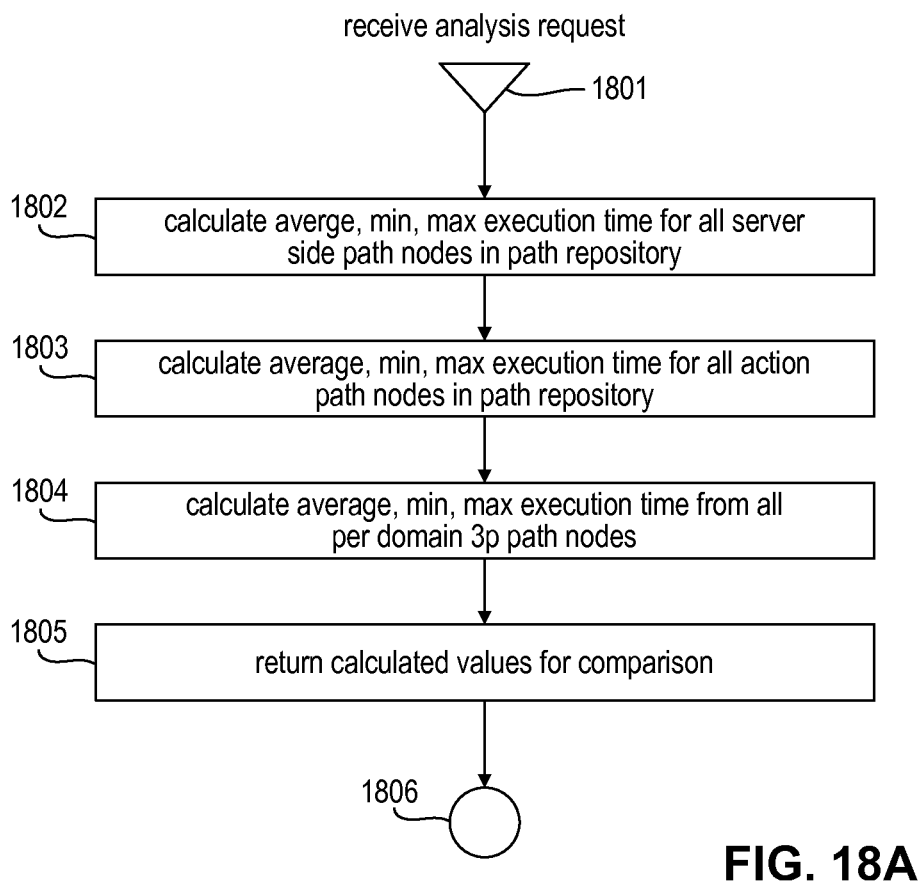
Figure 18B:
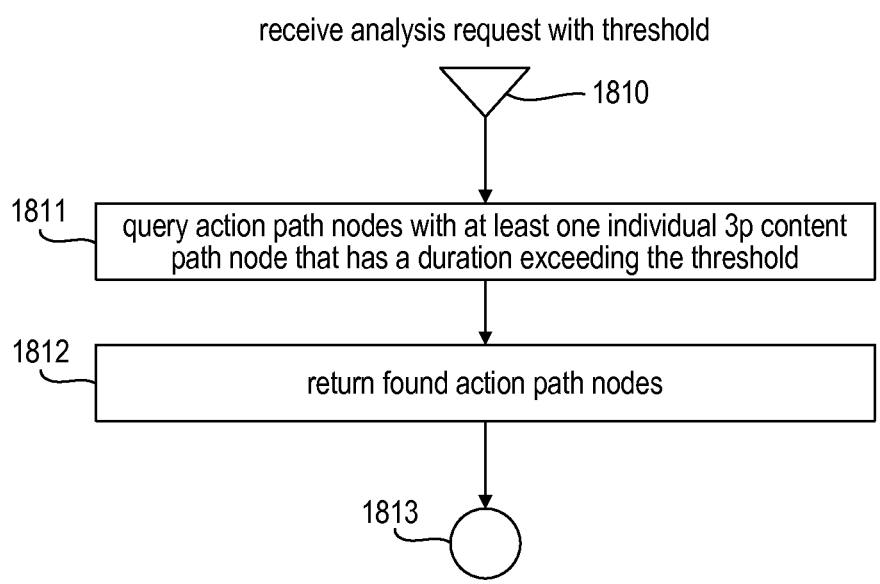
Figure 18C:
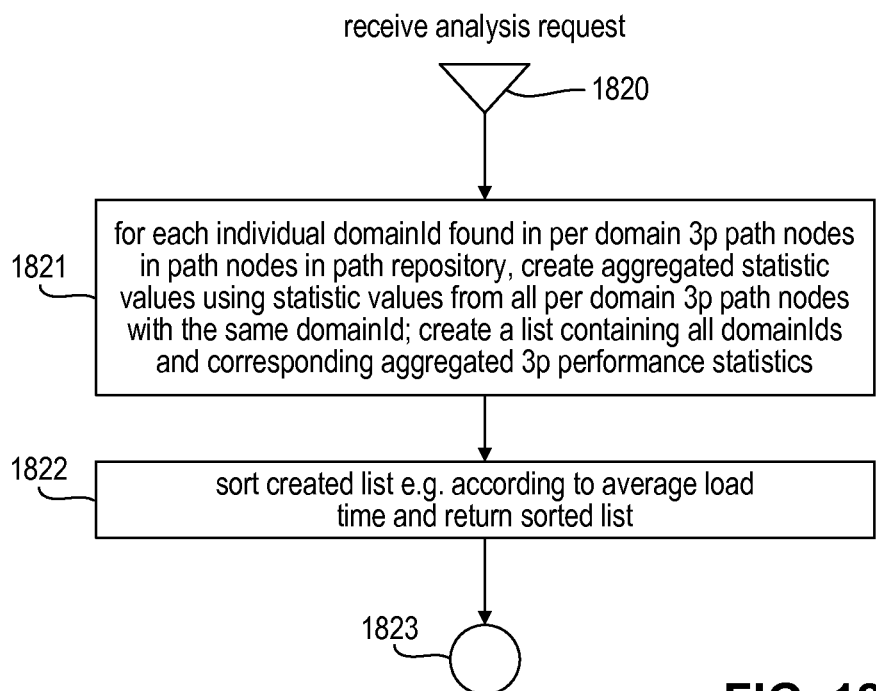
Figure 18D:
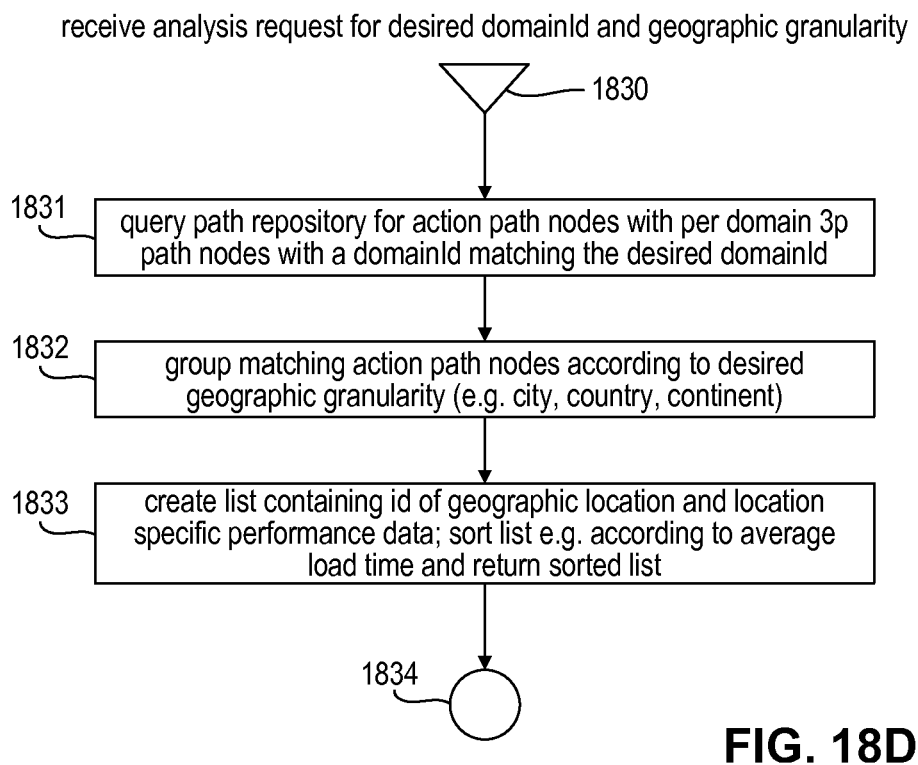

FIGS. 18A-D: show some exemplary analysis tasks which can be performed based on the collected third party resource load performance data. FIG. 18a shows an analysis that relates the time spent to load third party resource to other server side and browser side activities. FIG. 18b shows an analysis that identifies third party load requests with a load duration that exceeded a specific threshold. FIG. 18c depicts an analysis that creates a ranking of all detected third party resource providing domains according to specific statistical performance data. FIG. 18d shows an analysis process that detects performance deviations for a specific third party resource provider depending on the geographic location of the requesting browser.

Corresponding reference numerals indicate corresponding parts throughout the several views of the drawings.

DETAILED DESCRIPTION

An overview of a monitored system, including a monitoring node 133, an instrumented web server 123, and a browser 101 displaying instrumented content 102 is displayed in FIG. 1. The browser 101 communicates via a computer network 116 with the instrumented web server 123, on-premise web servers 122 and external resource providers like content delivery networks 120 and third party web servers 121.

The browser 101 currently displays content 102, which it received from the instrumented web server 123. A browser agent 201 is injected to the content, and third party resource load directives 105 and actions 110 are instrumented with resource sensors 108 and action sensors 111 that capture correlation and performance data. The captured data is sent to the browser agent 201 in form of third party end events 301 and action events 112. The browser agent 201 forwards the received events to the action monitor request handling method 126 of the instrumented web server 123 which provided the instrumented content 102. Third party resource load directives 105 are detected and instrumented with resource sensors 108 in both instrumented static content 105 (which is created out of received static content by the browser agent 201 through instrumenting third party resource load directives 105) and in instrumented scripts 107 (which is created out of receives scripts by the browser agent 201 through instrumenting third party resource load directives 105 and actions 110).

Examples resource load directives noted in HTML syntax would be an image tag like <img src=http://thirdparty.com/images/image1.jpg/> which requests an image resource, or a script tag like <script src=http://thirtparty.com/scripts/script1.js/>, which requests a script resource.

Third party resource request directives 105 are configured to request resources from sources that are typically not controlled by the operator of the monitored application, like e.g. third party web servers 121 or external content delivery networks 120. Non-third party resource load directives 109, which are requesting resources form the instrumented web server 123, or from on-premise web servers 122, are typically not instrumented. Those non-third party requests 118 may be tagged with action correlation data 119 which allow identifying the action execution on the browser that caused the sending of those requests. On-premise web servers 122 are web servers controlled by the vendor of the monitored application. Those on-premise web servers may also be instrumented with an agent 129 and provide server side performance data about resource requests handled by those on-premise web servers. Additional browser side performance data for such requests may not be necessary for typical performance monitoring use cases. However, it is possible to also perform browser side performance monitoring of resource requests directed to the web server providing the content 102 and to on-premise web servers, in case more detailed resource loading performance data is desired which contains both web server and browser perspective.

Detection and instrumentation of third party resource load directives also includes registering of third party records 401 with the third party data monitoring section 240 of the browser agent 201. Third party records contain data to identify the corresponding third party resource load directive 105, and timing data identifying the point in time when the third party resource request directive 104 was detected and instrumented. The resource sensor 108 is installed in a way that it is executed after the loading of the requested resource is finished. During execution, the resource sensor 108 creates a third party end event 301 and initializes it with data identifying the third party resource directive 105 to which the executed resource sensor 108 is instrumented, and with timing data describing the point in time, when the requested resource was loaded by the browser. Additionally, data describing a success state of the resource loading may be added to the third party end event 301. The third party end event 301 is sent to the third party resource monitoring section 240 of the browser agent 201, which fetches the corresponding third party record 401 describing the same third party load directive, and updates the performance data of the fetched third party record with the resource load end time stamp and the resource loading success status of the received third party end event 301.

The browser agent 201 also receives action events 112 from action sensors 111 which are instrumented to actions 110 triggered by user interactions and creates and stores correlation data allowing the identification of the corresponding action and the user interaction element which was used to trigger the action execution, and performance data describing the performance of the monitored action execution.

The browser agent 201 creates an action monitor request 114 containing action performance data 901 and sends it to the action monitor request handling method 126 of the instrumented web server 123 that provided the content 102 with the injected browser agent 201. The action performance data 901 contains correlation data and performance data describing detected action executions and third party load requests. The provided correlation data allows the identification of actions and third party requests, and it also allows for a specific recorded third party request, to identify which specific action execution trigged the recorded third party request.

The action monitor request handling method 126 converts the received action monitor requests 114 into action events 1210 containing the action performance data 901 received with the action monitor request 114. The action events are then forwarded to the agent 129 deployed to the instrumented web server 123. The agent additionally receives server side events 1201, describing monitored server side transactions. Such transactions may e.g. be caused by the processing of non-third party resource requests 118 by a request handling method 124, which is instrumented with sensors 125, that monitor those transaction executions and create transaction tracing and performance data in form of server side events 1201. Those server side events are sent to the agent 129.

The agent 129 sends the received action events 1210 and server side events 1201 via a computer network 131 to monitoring node 133 for correlation and analysis. Both action events 1210 and server side events 1201 are tagged with the agentId 130 of the agent 129 deployed to the instrumented web server, which allows the identification of this individual instrumented web server 123 as the provider of those events.

The monitoring node 133 receives those server side and action events, and forwards them to its event collector 134, which in turn forwards them to the event correlator 135. The event correlator 135 is divided in a browser correlator 137 which receives and correlates action events describing browser side activities, a server correlator 136 which receives and correlates serve side events describing server side activities, and the path combiner 138, which combines browser side transaction tracing data created by the browser correlator 137 with server side transaction tracing data created by the server correlator 136 according to action correlation data received with server side and action events. The action correlation data 119 allows for each individual recorded browser side activity to identify the recorded server side activities caused by this individual browser side activity.

Browser correlator 137, server correlator 136 and path combiner 138 store the created tracing data describing browser side, server side or combined browser/server side tracing data in a path repository 139. The content of the path repository may also be persisted on a hard disc, in a data base or in a distributed storage system like a distributed non SQL storage system.

An analysis and visualization unit 140 may use the tracing data stored in the path repository 139 for further analysis and visualization. The analysis results may also be stored on a hard disc, in a data base or in a distributed storage system like a distributed no SQL storage.

A block diagram of the browser agent 201 is provided in FIG. 2. The browser agent 201 is subdivided in an instrumentation section 210, a correlation section 220, an action monitoring section 230 and a third party resource monitoring section 240.

The instrumentation section 210 performs the instrumentation of actions and third party resource load directives with action sensors 111 and resource sensors 108 by the action instrumentation module 211 and the third party resource detection and instrumentation module 212. The instrumentation section receives notifications indicating an update of the document object model (DOM) of the content 102 to which the browser agent 201 is deployed. Such DOM update notifications indicate a change of the content 102 displayed by the browser, and on receiving such an event, the instrumentation section 210 analyzes the content for changes and performs instrumentation of new detected actions or third party resource load directives or optionally cleans up instrumentations for no longer available content elements. Especially loading of new content 102 by the browser 101 constitutes a DOM update which triggers DOM update processing by the browser agent 201.

The correlation data manager 221 contained in the correlation section 220 provides correlation data that allows the identification of the browser instance and content view on which a specific action was executed, and also correlation data that allows the identification of the executed action. The provided correlation data allows to uniquely identify a specific monitored action execution. The correlation data manager 221 is notified by the action data manager 231 about detected starts and terminations of action executions and updates the correlation data accordingly.

The action monitoring section stores tracing and performance data describing monitored action executions, and sends this tracing and performance data in form of action monitor requests 114 to a receiver which may e.g. be the instrumented web server 123, which forwards the request to an action monitor request handling method 126. The action monitor request handling method 126 may be created by the agent 129 during the instrumentation of the instrumented web server 123. The action data manager 231 receives action events describing monitored action executions, and stores tracing and performance data describing the history of those action executions in form of action records 234 in its action list 233. Data describing the currently ongoing action execution in is stored in the current root action record 235. The current user interaction data stack 232 is used to detect currently ongoing user interactions, and may be used to filter and only record actions triggered by user interactions. The action monitor request sender 235 repeatedly requests action tracing and performance data, third party resource loading performance data from the action data manager 231 and from the third party data manager 241 and correlation data from the correlation data manager 221. The requested correlation, tracing and performance data is used to create and send action monitor requests 114.

The third party resource monitoring section 240 contains a third party data manager 241, which receives third party end events 301 created by resource sensors 108. The third party data manager 241 also maintains a third party record list 242, which contains third party records 401 representing all currently instrumented third party resource load directives 105 available in the content 102 currently displayed by the browser 101. For each received third party end event 301, the third party data manager 241 searches for the matching third party record 401, and the found third party record is updated with the performance data describing the finished loading of the third party resource as provided by the received third party end event 301. The third party data manager 241 also contains a third party monitoring configuration record 245, which is used to configure the third party resource monitoring process. It may contain but is not limited to a list of origin/on-premise hosts 246 which identifies those hosts which should not be considered as third party resource providing hosts, a cyclic check period 247, a cyclic check interval 248 and a cyclic check start 251, which may be used by the third party resource detection and instrumentation module 212, to perform extended detection and instrumentation of third party resource loading directives in case of potential DOM update notifications, and thresholds 249 and reporting configurations 250, to filter which monitored third party resource load requests should be reported.

The reporting configuration may e.g. define to only report a limited number of the slowest third party resource load requests. In case summary statistic data is generated per third party domain, the reporting configuration may also define to only report a limited number of the slowest third party domains, or the third party domains producing the most resource load errors. Various reporting configurations may be used to filter and provide performance and behavior relevant third party load performance data and to reduce bandwidth utilization by the monitoring system.

The origin/on-premise hosts list 246 may be used to store the name of the instrumented web server 123 which provided the content 102 currently displayed by the browser 101. Additionally, it may be used to store a list of on-premise host names. The host names in the origin/on-premise host list 246 may be used by the third party resource load monitoring system to distinguish between third party resource request and non-third party resource requests, by identifying requests directed to a host with a name not contained in the origin/on-premise host list 246 as third party resource request. Variants of the current disclosure may omit monitoring of detected non-third party resource request, while other variants may also monitor and report non-third party resource requests and provide resource loading performance data in a way that allows to distinguish between third party and non-third party resource requests. (e.g. by adding a flag "isThirdParty" to individual third party data entries 920 and to per domain third party performance data entry 930)

A third party end event 301, as shown in FIG. 3, provides data describing the finalization of a resource load request that requested a third party resource. Such events are created, initialized and sent by resource sensors 108 on a finished resource load, and are received by the third party data manager 241 in the resource monitoring section 240 of the browser agent 201, which combines the data provided by the received third party end event with the data of the corresponding third party record. A third party end event 301 may contain but is not limited to a resourceId 302 which identifies the causing resource load directive, which allows to identify the corresponding third party record 401, a timestamp 303, which identifies the point in time when loading of the requested resource was finished, and a success flag which indicates whether loading was successful or not.

Referring now to FIG. 4, which depicts a third party record 401 that may be used to represent third party resource load directives detected and instrumented by the third party resource detection and instrumentation module 212 of the browser agent 201. Such third party records are created during the third party detection and instrumentation process (see FIGS. 5 to 6b) and are inserted to the third party record list 242 of the third party data manager 241. A third party record 401 may contain but is not limited to a resource type 402, which identifies the type of the requested resource as e.g. image, script, sound file etc., a resourceId 403 which identifies the corresponding resource load directive, an actionId 404 which identifies the detected and monitored user triggered browser side activity that caused the creation and execution of the resource load directive, a start timestamp 405 identifying the point in time when the third party resource load directive was detected by the third party resource detection and instrumentation module 212, an end timestamp 406 identifying the point in time when the resource sensor 108 instrumented to the resource load directive detected that loading the requested resource was finished, and a success flag which describes whether loading the resource was successful or not. Resource type 402, resourceId, 403, actionId 404 and start timestamp 405 of a third party record 401 are set during the third party detection and instrumentation process. End timestamp 406 and success flag 407 are set when a corresponding third party end event 301 (e.g. matching resourceId of third party record 403 and third party end event 302) is received by the third party data manager 241.

The process depicted in FIG. 5 provides an overview of the processing performed at the initialization of the third party resource monitoring module 240 of the browser agent 201. This process is performed during the initialization of the browser agent 201. The browser agent 201 is typically initialized when new content 102 with an injected browser agent 201 is loaded by the browser 101. In an initial step 501, the third party resource monitoring module 240 of the browser agent 201 is loaded. Afterwards, step 502 is executed, which fetches the third party resource monitoring parameters from the response received by the browser that contained the new content 102. The sensor 125 injected to the request handling method 124 of the instrumented web server 123 that provided the response containing the new content with injected browser agent 201, also adds the third party resource monitoring parameters to the response. Additionally, step 502 interprets the third party resource monitoring parameters, and initializes the third party configuration section 245 with data received with the third part resource monitoring parameters. The third party monitoring parameters may contain but are not limited to a set of on premise hosts, determining a set of resource providing hosts which may be considered as non-third party, even if they differ from the host that provided the content (the instrumented web server 123), parameters to control the process of detecting and instrumenting new third party load directives in the current content, like a cyclic check period and a cyclic check interval, and reporting parameters determining which and how detailed monitored third party resource loads should be reported.

Subsequent step 503 determines the origin host of the new content. This may be performed by e.g. analyzing meta-data received with the response containing the new content. For e.g. HTML based content, this may be performed by fetching the URL of the content (e.g. by accessing JavaScript property "document.location.href") and extracting the sever name from the URL. The server name identifies the host computer that provides the content. Resource load directives directed to this host computer may be excluded from third party resource load monitoring.

The following step 504 registers the third party resource monitoring module 240 as listener for DOM update events. This may either be performed by registering it directly with the browser 101 as listener for such events, if the browser implementation directly supports such notifications, or by registering it to a potential DOM update detection mechanism implemented by the browser agent 201. Such mechanism may, if no support from the browser is available, detects user interactions performed on the content, by instrumenting user interaction elements of the content. As each user interaction potentially causes an update of the DOM, such detected user interactions are also interpreted as DOM updates and the third party resource detection and instrumentation module 212 is notified.

An example for such user interaction caused DOM updates in HTML based content would be a user interaction triggered action execution that sends an XML HTTP request (XHR) and the received response contains commands to update the DOM of the currently displayed content with new resource load directives.

Following step 505 triggers a third party resource loading directive detection and instrumentation run as performed by the third party resource detection and instrumentation module 212. This run detects and instruments all third party resource load directives contained in the new content. For a detailed description of this process, please see FIGS. 6 to 6b. The process terminates with step 506.

The processing of a DOM update notification received by a browser agent 210 is shown in FIG. 6. If a browser 101 displaying content 102 with injected browser agent 210 supports notification of DOM updates, then the browser agent registers itself as listener for such events.

The process starts with step 601, when the browser agent 210 receives such a DOM update notification. A subsequent step 602 searches the DOM of the content 102 currently displayed by the browser 101 and already containing the notified DOM update, for DOM elements containing resource load directives that request third party resources which are not yet instrumented. Examples for such DOM elements in HTML based content would be <img src="http://thirdparty.com/images/image1.jpg"> for third party resources constituting an image, or for a DOM element loading a script, <script src="http://thirtparty.com/scripts/script1.js">. Searching for DOM elements containing resource load directives for third party resources may contain but is not limited to find DOM elements specifying the loading of a resource, like <img> or <script> tags, analyzing the tag parameter identifying the resource location, like a the value of a "src" parameter to detect if the resource location points to a computer other than the origin host or the specified on-premise hosts. The detection process may first identify if the "src" parameter contains an absolute or a relative URL. A relative URL (e.g. an URL starting with the character "/") points to a resource relative to the currently loaded content on the server from which the content was loaded. Thus, relative URLs do not point to third party resources and can be filtered out. For absolute URLs, the part of the URL that identifies the host from which the resource is loaded may be extracted and compared to the origin host and all specified on-premise hosts. If the host specified in the URL is different to the origin host and all specified on-premise hosts, then the URL points to a third party resource. Such DOM elements are checked if they are already instrumented with resource sensors. This may e.g. be performed by checking if the DOM elements contain an attribute which is added during third party resource detection and instrumentation. DOM elements passing all those checks are conveyed to the subsequent step 603.

Step 603 marks all received DOM elements as third party instrumented. This may e.g. be performed by adding a new attribute to the received DOM elements which identifies them as third party resource instrumented. Scripting languages like JavaScript, which may be used to implement a browser agent 210, and which may also be used to implement the process described in FIG. 6, allow dynamic adding of attributes to existing objects, like DOM elements. This feature may be used by step 603. Afterwards, step 603 forwards the received DOM elements to step 604.

Step 604 checks if a user interaction triggered action execution is currently ongoing. Such an ongoing user triggered action execution indicates that the new detected DOM elements containing resource load directives pointing to third party resources are caused by a user triggered activity, and thus may have an impact on the performance perceived by the user. This detection may e.g. be performed by checking if the current action record 235 of the action data manager 231 is currently set and refers an action record identifying a currently ongoing user triggered action execution. For details about detection and monitoring of user triggered action executions by the browser agent, reference may be made to U.S. patent application Ser. No. 13/722,026 entitled "Method and System for Tracing End-to-End Transactions, Including Browser Side Processing and Capturing of User Performance Experience" which is incorporated by reference herein. If step 604 detects that no user triggered action execution is ongoing, the process ends with step 610. Otherwise the detected and filtered new DOM elements are forwarded to step 606.

Step 606 creates a corresponding third party record 401 for each received DOM element and step 607 initializes resource type 402 and resourceId 403 with data extracted from the corresponding DOM element. The resource type 402 may e.g. be set to indicate an image resource if the DOM element loads an image, or to indicate a script resource if the DOM element loads a script. The resourceId may be set to a value uniquely identifying the corresponding resource load. As an example the URL identifying the resource which should be loaded may be used as resourceId. Additionally, step 607 sets the actionId 404 to a value that identifies the user triggered action which is currently being executed. The actionId may later be used to correlate performance and tracing data describing third party resource load requests with the performance and tracing data describing the individual user triggered action execution that caused these third party resource load requests. Finally, step 607 sets the start timestamp 405 of each third party record 401 to the current time.

Subsequent step 608 adds the previously created third party records 401 to the third party record list 242 of the third party data manager 241.

Afterwards, step 609 instruments each DOM element with a resource sensor 108 which monitors when loading of the requested resource is finished, and if loading was successful. As an example, event handlers may be attached to the DOM element which are executed on successfully or on erroneous loading of the requested resource. For the HTTP <img> element, this would be an "onLoad" and "error" handler.

After all detected new DOM elements requesting third party resources have been instrumented by step 609, the process ends with step 610.

A methodology for detecting and instrumenting new DOM elements requesting third party resources in cases where the browser 101 does not provide a DOM updated notification is shown in FIGS. 6a and 6b. The instrumentations placed by the browser agent 201 allow the detection of browser side activities that potentially cause a DOM update. Examples of such activities would e.g. be the sending of a request that does not exchange the whole content currently displayed by the browser, but potentially updates the currently displayed content, like an XML HTTP request (XHR) in an HTPM/Ajax environment. Such requests are identified as potentially DOM updating events, and start the process depicted in FIG. 6a, with step 601a. Subsequent steps 602a to 609a are performed identical to step 602 to 609 of the process described in FIG. 6. After execution of step 609a, step 610a is executed, which fetches the current timestamp at the browser, and stores it in the current cyclic check start field 251 of the third party configuration 245 of the third party data manager 241. Subsequent step 611a schedules the next execution of the cyclic DOM check process (described in FIG. 6b) to be executed at the point of time determined by the current cyclic check start 241, plus the cyclic check interval 248. Afterwards, the process ends with step 612b.

FIG. 6b shows the process which is triggered after a detected potential DOM update, and which is then cyclically executed for a timespan specified by the cyclic check period 247 of the third party configuration 245 of the third party data manager 241. The process starts cyclically, and is e.g. implemented as a timer task, which may be scheduled to run at any time in the future. If the process gets triggered (step 601b), the current timestamp at the browser is fetched in step 602b. Afterwards, check step 603b evaluates if the current timestamp fetched in step 602b is higher than the current cyclic check start 241 plus the cyclic check period 241. If the current timestamp is greater, which indicates that the check period is elapsed, the process ends with step 611b. Otherwise, step 604b, followed 605b are executed which are equal to steps 602 and step 603 described in FIG. 6. Afterwards, step 606b to 609b are executed which are equal to step 606 to 609 described in FIG. 6. Subsequent 610b schedules the next execution of the cyclic DOM check process (the process described in FIG. 6b) for the point in time described by the current timestamp plus the cyclic check interval 248. The process then ends with step 611b.

In contrast to the process described in FIG. 6, which processes an already performed DOM update which is notified by the browser, the processes of FIGS. 6a and 6b process a potential future DOM update caused by e.g. a response received as response to a monitored sending of a XHR. As the response is only available after the request is sent, a process is required that is triggered by an event that potentially causes a DOM update (e.g. an XHR request), and which afterwards cyclically (e.g. each time the cyclic check interval 248 elapsed) and for a specific timespan (e.g. until the cyclic check period 247 is elapsed) checks the DOM for changes, and processes detected relevant DOM changes.

FIG. 7 shows the execution of a resource sensor 108, which is triggered after the loading of a resource which was requested by a monitored resource request, is finished. The process starts with step 701, which is executed after loading of the requested resource is finished. The browser may send corresponding "onLoad" or "error" notifications, describing a successful or erroneous loading of the requested resource. The resource sensor 108 may be registered as listener for those notifications, which trigger execution of the resource sensor. Subsequent step 702 retrieves the current timestamp at the browser, determines the resourceId of the resource for which finished loading was indicated, and determines if loading of the resource was successful or not. The resourceId may be obtained by retrieving the URL of the requested resource, and the value of the success indicator may be determined by evaluating whether the resource sensor was triggered via the "onLoad" (successful load) or the "error" callback. Afterwards, step 703 creates a third party end event 301, and sets its resourceId 302 to the resourceId determined in step 702, its timestamp 303 to the timestamp retrieved in step 702 and its success flag 304 to the success indicator determined in step 702. The created third party end event 301 is sent to the browser agent 201 in step 704 and the process ends with step 705.

The processing of an incoming third party end event 301 by the third party data manager 241 is shown in FIG. 8. The process starts with step 801, when the third party data manager 241 receives a third party end event 301, and proceeds with step 802 in which a matching third party record 401 is searched in the third party record list 242 of the third party data manager. A matching third party record 401 may be a third party record with a resourceId 403 which is identical with the resourceId 302 of the incoming third party end event 301. If no matching third party record is found, the process ends with step 805. Otherwise, step 804 is executed, which merges the monitoring data of the found matching third party record 401 with the monitoring data of the incoming third party end event 301 by setting the end timestamp 406 of the third party record to the timestamp 303 of the third party end event, and setting the success flag 407 of the third party record 401 to the success flag 304 of the third party end event 301. The process afterwards ends with step 805.

FIG. 9 conceptually describes data records which may be used to store and transfer action execution performance data, together with third party resource loading performance data. An action performance data record 901, as shown in FIG. 9a may contain action origin correlation data 902 that allows identifying the origin of the monitoring data, like the browser instance and the individual content view on which the monitored actions were executed. A content view describes an individual view of a specific content by a specific browser. If the content is reloaded, and the browser shows the same content again, this is a different content view. An action performance data may also contain, but is not limited to general performance data 903, which may contain e.g. the size of the current content and content load specific performance data, like the duration from sending the response until the first byte of the content was available at the browser, or time until the DOM of the content was ready at the browser, content meta-data 904, which may e.g. contain data describing the content, like e.g. the name of the content, and an action performance data list 905, which contains performance data describing the performance of all monitored action executions on the content view identified by the action origin correlation data 902.

Figure 9A:
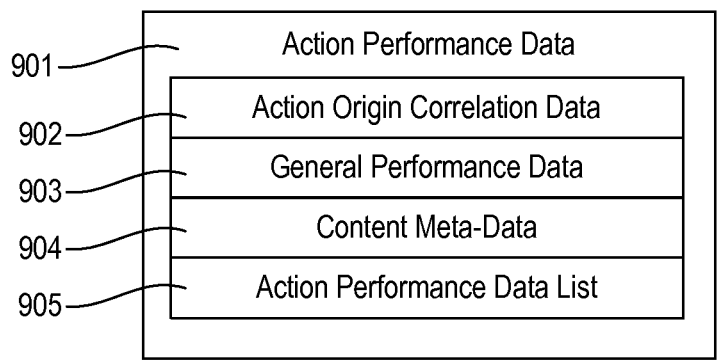
Figure 9B:
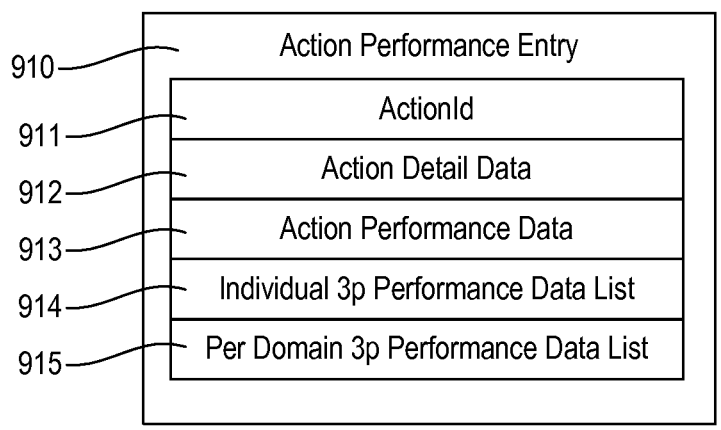

The action performance data list 905 contains an action performance entry 910 for each monitored action execution. An action performance entry as shown in FIG. 9b may contain but is not limited to an action Id 911 which identifies a specific action within the content view identified by the action origin data 902, action detail data which e.g. describes parameters of the monitored action execution, action performance data 913 describing performance characteristics, like execution duration of the monitored action execution, an individual third party performance data list 914, providing detailed performance for individual selected third party resource load requests caused by the monitored action execution and a per domain third party performance data list 915 which contains per domain statistical data of all third party resource load requests triggered by the monitored action execution.

Figure 9C:
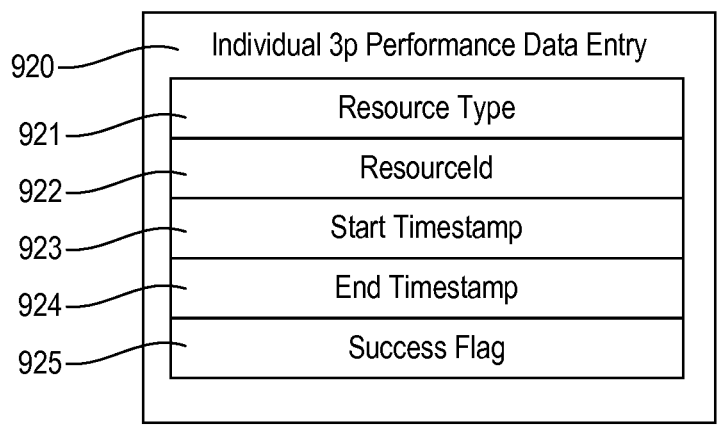
Figure 9D:
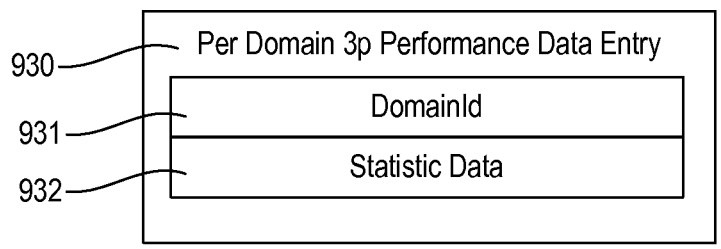

The detailed third party performance data list 914 contains individual third party performance data entries 920 as described in FIG. 9c. Each individual third party performance data entry 920 describes a monitored third party resource load request. Such an entry may contain but is not limited to a resource type 921, which identifies the type of the requested resource, like image, script, etc., a resourceId, which identifies the requested resource like e.g. the URL of the requested resource, a start timestamp 923, providing the point in time when the load request was recognized by the browser agent 201, and an end timestamp 924 providing the point in time when the corresponding resource sensor 108 detected that loading the resource was finished, and a success flag 925 which may be used to notify if loading the described resource load request was successful or not. Various other data describing the requested resources may be captured and sent to the monitoring node 133 for performance analysis, like e.g. the size of the requested resource in bytes.

The per domain third party performance data list 915 of an action performance entry 910 contains per domain third party performance data entries 930. Each per domain third party performance data entry 930 provides statistical data describing the resource load performance of an individual domain providing third party resources. The domainId 931 identifies a specific domain, and the statistical data 932 provides data describing the performance statistics of all resource load requests directed to the specific domain, like max load time, min load time, average load time etc. As an example, an action execution may request resources "http://www.cdn1.com/image1", "http://www.cdn1.com/image2" and "http://www.cdn2.com/image3". The browser agent may group the monitoring data describing the resource load requests by their server/domain name, in this case "www.cdn1.com" and "www.cdn2.com" and calculate statistical performance data for each group This would result in two per domain third party performance data entries, one with domain Id set to "http://www.cdn1.com" and with statistic data describing the load of "image1" and "image2", and another one with domain Id set to "http://www.cdn2.com" and with statistic data describing the load of "image3".

The process of sending action performance data, including third party resource load performance data from a browser agent 201 to a receiver like e.g. an action monitor request handling method 126 is shown in FIG. 10. The process is started when the browser agent 201 decides to send action measurement data with step 1001. This decision may e.g. be timing based, like 5 seconds after a monitored action execution is finished, or based on the size of stored action monitoring data to reduce monitoring caused memory consumption on the browser. Various other strategies may be employed by the browser agent to determine when action performance data is sent. Some exemplary strategies are described in U.S. patent application Ser. No. 13/722,026, entitled "Method and System for Tracing End-to-End Transactions, Including Browser Side Processing and End User Performance Experience". In a subsequent step 1002, the process fetches the action list 233 from the action data manager, and checks in step 1003 if the list is not empty and contains at least one entry describing a finished action execution. If the list is empty, or no entry describing a finished action execution is available, the process ends with step 1013.

Otherwise, the process continues with step 1004 which creates an action performance data record 901, and initializes its action origin correlation data 902, general performance data 903 and content meta-data with correlation data fetched from the correlation data manager 221 and data describing general performance characteristics of the current content view and data describing the current content from the browser 101. Subsequent step 1005 creates an action performance entry 910 for each action record 234 describing a finished action execution. ActionId 911, action detail data 912 and action performance data 913 of each created action performance entry is initialized with corresponding data from the corresponding action record 234. Afterwards, the action records 234 are removed from the action list 233 to avoid multiple reporting of the same action execution.

Subsequent step 1006 fetches the third party records 401 stored in the third party record list 242 of the third party data manager 241, and step 1007 assigns third party records 401 to the performance data entry describing the action execution that caused the resource load requests. This may be performed by assigning third party records 401 to the action performance entry with matching actionId.

Step 1008 creates per domain third party performance data entries for each action performance entry 910 and its associated third party records 401. This may e.g. be performed by first grouping the associated third party records 401 of an action performance entry by their domain, and then calculating statistical data for each domain group. For each domain, a per domain third party data entry 930 is created, its domainId 931 is set to the name of the domain, and its statistic data 932 is set to the statistic data calculated from the third party records 401 with matching domain. The per domain third party performance data entries 930 are then appended to the per domain third party performance data list 914 of the action performance entry 910. Step 1008 is performed for each action performance entry 910 in the action performance data list 905.

Following steps 1009 and 1010 identify for each action performance entry 910 in the action performance data list 905 those third party records 401 which show the most interesting (e.g. longest load time, or failed loading) performance behavior. A limited number of those third party records (e.g. 5 with highest load time) is selected according to the reporting configuration 250 of the third party data manager 241, and for each of those selected third party records 401, a individual third party performance data entry 920 is created, and initialized with corresponding data from the corresponding third party record 401. The created individual third party performance data entries 920 are appended to the individual third party performance data list 914 of the action performance entry 910. Step 1009 and 1010 are performed for each action performance entry 910 in the action performance data list 905. A similar selection for most interesting per domain third party performance data entries (e.g. domains with most failed requests, longest average load time etc.) may be performed according to reporting configuration data 250 settings.

Subsequent steps 1011 and 1012 clear the third party record list 242 of the third party data manager and create and send an action monitor request containing the created action performance data record 901. The process then ends with step 1013.

FIGS. 10a and 10b describe an alternative approach for reporting third party resource load request performance data, which uses resource load performance data stored in a resource timing data repository, as described in the W3C Resource Timing specification (see e.g. http://www.w3.org/TR/2011/WD-resource-timing-20110524/), instead of the performance data measured by the resource sensors and the browser agent. Only data about detected resource load requests per monitored action execution, which is created by the browser agent 201, e.g. in form of the third party records 401 stored in the third party record list 242, is used. This browser agent generated data describing third party load requests caused by monitored action executions, is then enriched with corresponding performance data fetched from the resource timing data repository.

FIG. 10a conceptually describes a browser 101 containing a resource timing data repository 1004a, as described in the W3C Resource Timing specification. The resource timing data repository 1004a contains a performance resource timing entry 1005a for each resource 109 requested by the currently loaded content 102. A performance resource timing entry 1005a contains timing data describing the load performance of a specific resource. Additionally, it contains matching data which allows the identification of the resource for which it stores load performance data. Such performance resource timing entries are available for all resources loaded by the content, regardless if the resource is loaded by static data 1001a or scripts 1002a. The matching information stored in the performance resource timing entries allow to create a relationship 1003a between a resource 109 and its corresponding performance resource timing entry 1005a.

The process depicted in FIG. 10b describes the sending of action performance data, similar as the process described in FIG. 10. However, FIG. 10b shows a variant, which uses a resource timing data repository 1004a, according to the W3C Resource Timing specification to access performance data of third party resource load requests instead of performance data generated by resource sensors 109 and the browser agent 201.

Steps 1001b to 1006b are equal to the steps 1001 to 1006 described in FIG. 10 and executed in the same order. The subsequent step 1007b fetches matching performance resource timing entries 1005a from the resource timing data repository 1004a for each third party record 401 fetched in previous step 1006b. Matching may be based on the resourceId 403 of the third party records which may contain the URL of the requested resource. Following steps 1008b to 1014b are similar to steps 1007 to 1013 described in FIG. 10. The only difference between steps 1008b to 1014b and 1007 to 1013 is that the first set of steps uses performance data stored in the performance resource timing entries instead of performance data (e.g. start timestamp 405, end timestamp 406, success flag 407) stored in the third party record.

The timing diagram showed in FIG. 11 exemplary describes dependencies between user interactions 1101, which cause action executions performed by the content 102 currently loaded by the browser, content update requests (XHR) send by the browser, receiving corresponding responses, DOM updates and subsequent resource requests triggered by those DOM updates, and notifications and activities received and performed by the browser agent 201.

A user interaction 1101 performed by the user, like e.g. clicking on an user interaction element in form of a button displayed as part of the content 102 currently displayed by the browser, triggers sending a content update request 1102, which is recognized by a sensor placed by the browser agent 101. The sensor notifies the browser agent 201 about a started action execution 1109. The browser agent 201 creates an action record 234 which represents the detected action execution. The action record stores all action execution relevant performance data. An actionId is assigned to the action record which identifies the action record.

The request is sent to the instrumented web server 123, which receives it, composes a corresponding response and sends it back to the browser 101. At a later point in time, the browser receives the response 1103, which contains content update commands that also cause a DOM update. The browser performs the requested DOM update 1104, which adds two new resource request directives request resource 1, 1105 and request resource 2, 1107 to the DOM. Adding of those resource request directives is recognized by the third party resource detection and instrumentation section 212 of browser agent 201, and corresponding third party records 401 are added to the third party record list of the third party data manager. The actionIds 403 of the third party records are set to the actionId of the previously create action record. This is in an abstract way described here with the resource request notifications 1110 and 1111.

A sensor placed by the browser agent 201 detects that the response handling containing the DOM update 1103 is finished, and sends a notification indicating that the response handling is finished 1112, to the browser agent. As there are still two resource requests ongoing, for which no corresponding resource loaded notifications were received by the browser agent 201, the action execution started by the user interaction caused request sending 1102 is not marked as finished.

At some point in time later, the loading for the resources requested with resource request 1, 1105 and resource request 2, 1107 is finished and resource loaded notifications are sent by the browser for resource 1, 1106 and resource 2, 1108, the corresponding resource sensors 108 are executed, and notify the browser agent about the finish loading of those resources by a resource loaded notification 1113 for resource 1 and resource loaded notification 1114 for resource 2. Those notifications are implemented by the resource sensors creating corresponding third party end events 301 and forwarding them to the browser agent 201. After the browser agent 201 has received third party end events 301 for all third party records 401 registered for the action execution started with the request sending 1102, the corresponding action record is marked as finished 1115, and also stores the current timestamp as end timestamp of the action execution described by the action record created before. At some point later in time, the browser agent 201 triggers sending of action performance data 1116 (for details see FIGS. 10 to 10b), which sends action execution and third party resource loading performance data describing the monitored action execution. FIG. 11 also shows another alternative strategy to determine the timing of action performance data sending. In addition to the strategies described in U.S. patent application Ser. No. 13/722,026, which only consider action execution tracing data to determine when action performance data sending, this strategy also considers third party resource load requests initiated by an action execution to determine if an action execution is finished and in turn to determine when action performance data is sent from the browser agent 201 to the action monitor request handling method 126.

The above described processing allows connecting activities triggered by the user with resource requests caused by DOM changes which are in turn caused by the user triggered activity. This allows a much exacter measurement of the performance as perceived by the user. As an example, the original sending of the DOM update request, receiving the response and updating the DOM may e.g. be performed fast, in about 5-10 milliseconds. However, the DOM update caused the request for a resource with 15 MB, which lasts about 1-5 minutes, depending on the performance of the used network connection. The above described processing allows to detect that for the user, the perceived time between triggering the action and the availability of the expected result at the browser 101 was not 5-10 milliseconds as seen by e.g. a monitoring system only considering DOM updates, but more than a minute as seen by a monitoring system also considering resource requests caused by the user triggered DOM update. It is noteworthy that the above described processing may be performed for all resource request caused by a user triggered DOM update, and not only for resource requests requesting third party resources. The same processing may also be applied to user interactions that cause the loading of new content to the browser. In this case, the triggered DOM update 1104 would not only perform partial update of the currently viewed document, but the document object model would be completely replaced. However, the instrumenting and monitoring processes for user triggered browser side activities and for resource load requests caused by those browser side activities remains the same.

FIG. 12 shows event nodes, which may be used to transport data describing monitored server side method executions, and monitored browser side action executions, including data describing action caused loading of third party resources. A server side event node 1201 as described in FIG. 12a, may contain but is not limited to correlation data to identify a specific method execution by a specific thread in form of thread correlation data 1202, an agentId 1203 which allows the identification of the specific process or virtual machine which executed the specific thread and action correlation data 1204, which allows to identify the specific action execution on a specific content view of a specific browser which caused the server side activity described by the server side event node 1201. The action correlation data 1204 may be empty, in case the described server side activity was not caused by a monitored browser action execution. Multiple server side event nodes may be tagged with the same action correlation data, in case one specific monitored browser side action execution triggered multiple monitored server side activities. Additionally, a server side event node may contain measurement payload data containing performance information of the monitored server side activity, like e.g. the execution duration of monitored method executions.

An Action event node 1210 as described in FIG. 12b may contain but is not limited to action origin correlation data 1211 that allows the identification of browser instance and individual content view in which the monitored action executions were performed, an agentId 1212, which identifies the instrumented webserver 123 which received the action monitor request 114 that caused the creation of the action event node 1210 via the agentId 130 of the agent 129 deployed to the instrumented webserver 123, browser location and meta-data 1213 which may contain data identifying the geographic location of the browser instance 101 on which the monitored action executions were performed together with meta-data describing the content on which the action executions were performed, like its name or URL or meta-data describing the browser instance like a browser type or version, and an action performance data list 1214 which may contain data describing the performance data of the monitored action executions, including data describing the performance of third party resource load request triggered by the monitored action executions.

The flowchart shown in FIG. 13, describes the execution of an entry sensor placed to a request handling method 124. An entry sensor is a sensor 125, placed at the beginning of a request handling method 125. Other sensors may be placed on other positions of request handling methods like on each exit point of the method or in other methods. Placement of sensors may be performed by the agent 129 during startup or runtime of the instrumented web server 123 using byte code instrumentation. The request entry sensor 1301 is invoked in step 1301 when the request handling method 124 receives a request, before the original code of the request handling method is executed. In a subsequent step 1302, the entry sensor checks if the incoming request is an action monitor request 114. In case check 1302 results that an action monitor request 114 was received, the process continues with step 1303 which forwards the action monitor request to the action monitor request handling method 126. Also the action monitor request handling method may be created by the agent 129 using byte code instrumentation. In step 1304, the action monitor request handling method 126 checks if the incoming request is a valid action monitor request. In case the request is not a valid action monitor request, the process ends with step 1317. Otherwise, action origin correlation data in form of a sessionId identifying the individual browser instance that executed the monitored actions, and a frameId which identifies the individual content view on the browser that executed the monitored actions is extracted from the action monitor request in step 1305. Additionally, action performance data, browser location and meta-data are extracted from the action monitor request in step 1305. Subsequent step 1306 gets the agentId 130 from the agent 129 deployed to the instrumented webserver 123 that received the request, and following step 1307 creates an action event node 1210 which is initialized with the previously acquired data. Afterwards, step 1308 sends the action event node 1308 to the agent 129 and the process ends with 1317.

In case step 1302 detects that the incoming request is not an action monitor request 114 but an application specific payload request, processing continues with step 1309, which checks if the execution of this sensor is the first sensor execution within the current thread. This check may e.g. be performed by using a thread local which is set during a sensor execution in case it is not yet present. In case the thread local is already available, the current sensor execution is not the first one within the current thread.

In case check 1309 detects that the current sensor execution is not the first one by the current thread, execution continues with step 1315 which creates a server side event node 1201 and initializes the server side event node to describe the invocation of the method to which the sensor is instrumented. The thread correlation data 1202 is set to identify the current thread execution, the agentId 1203 is set to the agentId 130 of the agent 129 deployed to the virtual machine or process that executes the current thread, like e.g. an instrumented web server 123. The action correlation data 1204 is cleared, because the created server side event node 1201 describes a nested method invocation within a monitored thread, which cannot directly be triggered by an action execution on a browser. Additionally, step 1315 acquires payload data, like method parameter values or performance measures and adds the acquired payload data to the measurement payload data 1205 of the previously created server side event node 1201. Subsequent step 1316 sends the server side event node created and initialized in step 1315 to the agent 129, and the process ends with step 1317.

In case step 1309 detects that the current sensor execution is the first one within the current thread, execution continues with step 1310, which creates and initializes a server side event node 1201 that describes a new thread execution. The thread correlation data 1202 is set to identify the current thread. If parent thread correlation data is available, the thread correlation data is set to reflect the parent-child relationship between the thread that triggered the current thread execution (the parent thread) and the current thread (child thread). The parent thread correlation data may be made available by corresponding tagging and tag extraction sensors, as described in detail in U.S. patent application Ser. No. 12/191,409, entitled "Method and System for Tracing individual Transactions at the Granularity Level of Method Calls throughout Distributed Heterogeneous Applications without Source Code Modifications" which is incorporated by reference herein. The agentId 1203 is set to the agentId 130 of the injected agent 129, measurement payload data 1205 for the new thread execution is acquired, which may contain but is not limited to the name of the current thread, its execution priority, its thread group name or CPU time already consumed by the thread. The acquired measurement payload data is set to the measurement payload data 1205 of the create server side event node 1201. The action correlation data 1204 is temporarily cleared, as subsequent steps determine if it should be set. Step 1311 afterwards checks if the request handled by the current request handling method execution is a request that is coming in directly from the browser 101, and was never before handled by a request entry sensor. This may be performed by checking if parent data describing a parent thread execution is available. If parent thread data is available, the process continues with step 1314, which sends the previously created server side event node 1201 describing a new monitored thread execution to the agent 129. Afterwards, earlier describes steps 1315 to 1317 are executed.

The reason for this check is, to only perform browser agent communication/correlation related tasks once, when a request from a browser with injected browser agent enters the server side part of the monitored system. This avoids multiple reporting of browser action execution caused server side activity in configurations where e.g. an instrumented load balancing web server receives a request and forwards it to an also instrumented worker web server. In this case, only the request handling performed on the load balancing web server would report a new thread execution triggered by a browser side action execution. At the worker web server, a new thread execution would correctly be reported which is triggered by a thread execution at the load balancing server, and not by a browser side activity.

In case step 1311 detects that the request is an incoming request, received directly from the browser 101, execution continues with step 1312 which analyzes the incoming request to determine if a browser agent 201 should be injected in the requested response. This may e.g. be performed by the mime type of the response to detect if the type of the requested response is new content requested by the browser, with e.g. mime type "text/html". Responses containing content of this type are loaded and interpreted by the browser as new content, and injection of a browser agent 201 is required. In case the mime type e.g. indicates a resource requested by the browser to render already loaded content, like a request for a script or image file, with mime type like "text/javascript" or "img/ jpg", no browser agent is injected into the response. The browser agent 201 may either be directly injected into the response by adding browser agent code to the response, or by adding a load directive pointing to a location providing browser agent code, which is interpreted by the browser 101 during handling the received response, and which causes the browse to load the browser agent 201. Both types of browser agent injections are performed in a way that the browser 101 receiving the content with injected browser agent loads and initialize the browser agent before processing other parts of the received content.

Afterwards, step 1313 is executed which extracts action correlation data 119 from the received request, and stores it in the action correlation data field 1204 of the previously created server side event node 1201, if such action correlation data 119 is available in the request. Action correlation data may not be available if the incoming request is the first request received from a new browser instance 101. In this case, no browser agent 201 is yet available in the content of the browser and consequently the request does not contain action correlation data. Another reason for missing action correlation data may be a request received not from a browser, but caused by a manually sent request, or by a request sent by a custom front end application that communicates with a server using requests similar as a browser. The action correlation data 119 identifies the individual browser instance and content view, on which the action execution that caused the request was monitored, and also identifies the specific action execution which caused the request. Afterwards, previously described steps 1314 to 1317 are executed.

FIG. 14 shows data records which may be used to store performance monitoring and transaction tracing data representing tracing results of individual traced transactions spanning from monitored browser side action executions, to corresponding server side activities caused by those browse side action executions.

Figure 14A:
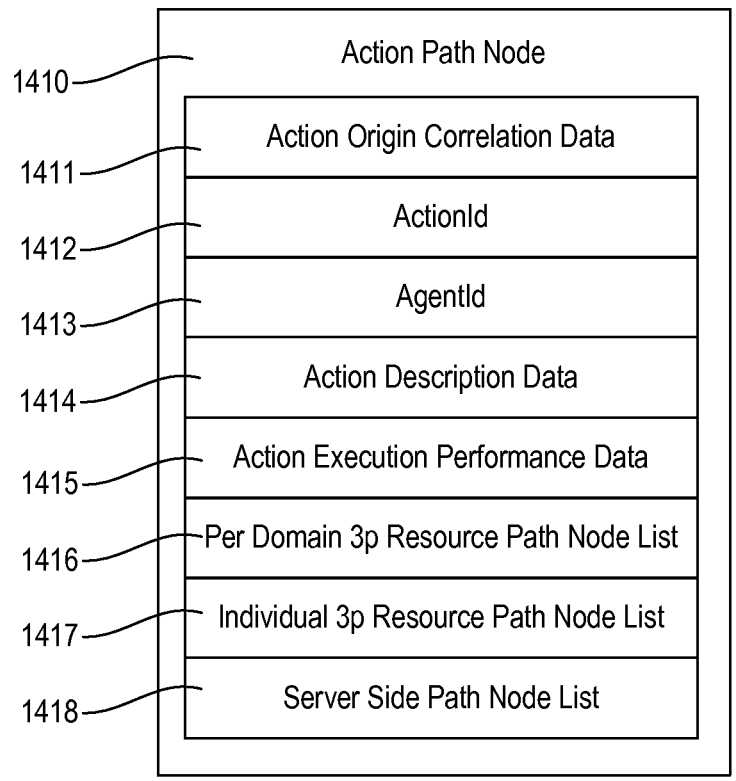

An action path node 1410 as described in FIG. 14*a*, contains data describing a monitored action execution on a browser, including data describing third party resource requests caused by the monitored action execution, together with a list of references to server side path nodes 1401 describing monitored server side activities caused by the monitored action execution described by the action path node. The action origin correlation data 1411 of an action path node 1410 identifies the individual browser instance and content view on which the described action was executed, the actionId 1412 identifies the executed action within browser instance and content view, the agentId 1413 identifies the process or virtual machine (e.g. an instrumented web server 123) that received the action monitor request 114 that contained the tracing and performance data describing the corresponding action execution by the agentId 130 of the deployed agent 129. Action description data 1414 may contain data describing the type of the described action execution, like e.g. the type of user interaction element used to trigger the action, like a click on a link or button, or entering of text into a text field. It may also contain action execution parameters, like e.g. in case of an action triggered by entry of text into a text field on the browser, the characters of the entered text. Action execution performance data 1415 may contain captured performance data of the monitored action execution, like e.g. action execution duration. The per domain third party path node list 1416 contains per domain third party resource path nodes 1420, which provide statistical performance data for each domain to which resource load requests were sent by the described action execution. The individual third party resource path node list 1417 contains detailed data for individual monitored third party resource loads triggered by the action execution that are of special interest, like e.g. the three slowest requests, requests for which load time exceeded a certain threshold or failed resource load requests. The server side path node list 1418 contains all server side path nodes 1401 that describe monitored server side activity caused by the action execution described by the action path node 1410.

Figure 14B:
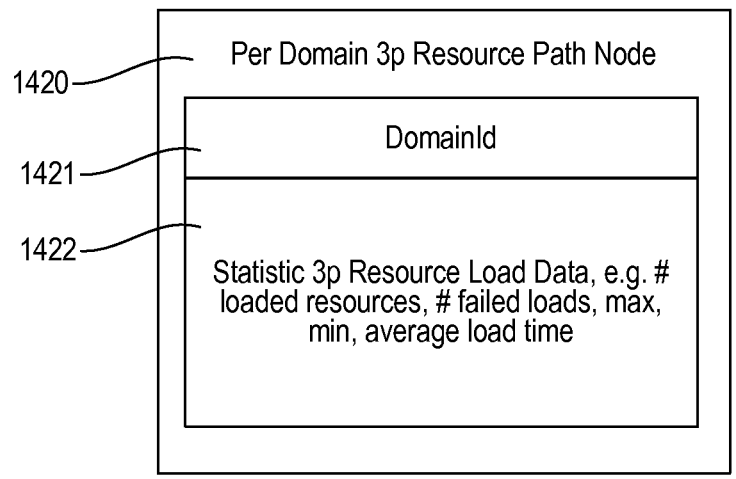

A per domain third party resource path node 1420, as described in FIG. 14*b*, may be used to describe per domain statistical data of third party resource requests caused by a specific monitored action execution. Such a per domain third party resource path node may contain but is not limited to domainId 1421 which identifies a specific domain from which one or more resources were requested by the monitored action execution, and statistic third party resource load data 1422, like e.g. average, min, max load time, nr of resources loaded from the domain, nr of failed loads etc.

Figure 14C:
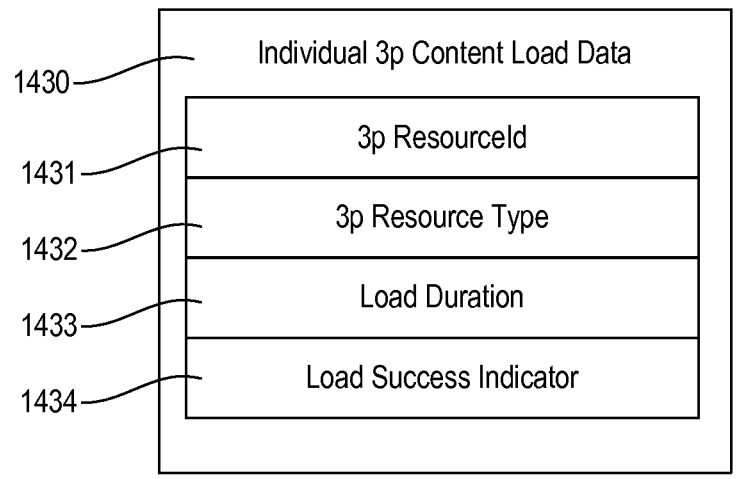

FIG. 14c shows an individual third party resource path node 1430, which may be used to provide detailed data describing an individual third party resource load triggered by a monitored action execution. It may contain but is not limited to a third party resourceId 1431, which identifies the requested resource in form of e.g. its URL, a third party resource type, which describes the type of requested resource, which may e.g. be an image, a script file or a sound file, a load duration which may provide the time elapsed between the third party resource load request was detected from the third party resource detection and instrumentation unit 212 of the browser agent 201, and the detection of the finished load of the resource by the corresponding resource sensor 108 as an approximation of the time required to load the resource, and a load success indicator 1434 which indicates whether loading the requested resource was successful or not.

Figure 14D:
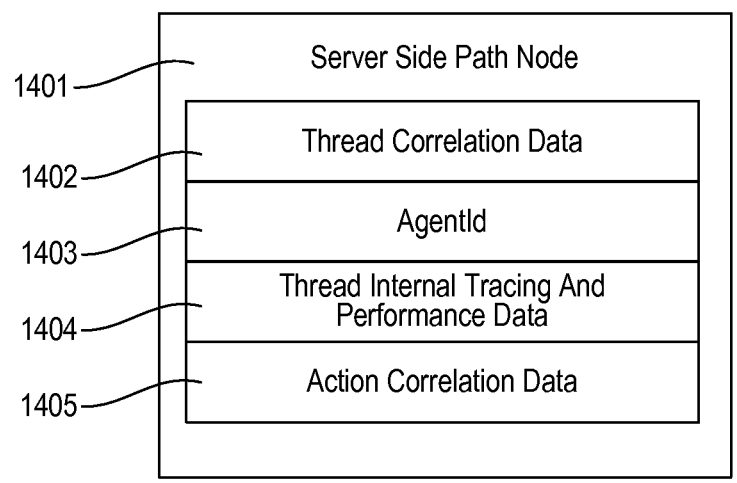

A server side path node 1401 as described in FIG. 14d describes monitored server side activity performed in a specific monitored thread execution, and may contain but is not limited to thread correlation data 1402 which identifies a specific thread execution within a specific process or virtual machine, an agentId 1403 which identifies the specific process or virtual machine via the agentId 130 of the agent 129 deployed to it, thread internal tracing and performance data 1404, which may contain tracing and performance data describing call nesting level and call sequence and performance data of monitored method executions within the monitored thread executions, and references to other server side path nodes 1401 describing monitored thread executions triggered by this thread execution. Additionally a server side path node 1401 may contain action correlation data 1405 which identifies the action path node instance that describes the monitored browser side action execution that cause the server side activity described by the server side path node. The action correlation data 1405 is only available if the described server side activity was directly triggered by an action execution.

Path nodes as described previously are created and connected to end-to-end transaction tracing data by the event correlator 137 and its subcomponents in response to incoming server side event nodes 1201 and action event nodes 1210 received from agents 129 deployed to various processes or virtual machines (e.g. instrumented web server 123), which are connected to the same monitoring node 133. Following FIGS. 15 to 17 provide an overview of this correlation process.

FIG. 15 conceptually describes the correlation of server side event nodes 1201 by the server correlator 136. The correlation process starts with step 1501 when the server correlator 136 receives a server side event node 1201. A subsequent step 1502 checks if the received server side event node 1201 notifies a new monitored thread execution. In case a new monitored thread execution is notified, the process proceeds with step 1503, which creates a new server side path node. The created server side path node represents the new thread execution reported by the server side event node 1201. Subsequent step 1504 queries the path repository 139 for a server path node 1201 that represents the parent thread of the thread represented by the server side path node created in step 1503. This may be performed by matching the part of the thread correlation data 1201 describing the parent thread execution of the reported new thread execution (e.g. a parent agentId and a parent threadId), with parts of thread correlation data of existing server side path nodes identifying thread executions described by those existing server side path nodes (e.g. agentId 1403 and a threadId).

Step 1505 checks if a start path node representing the parent thread execution was found. In case no such start path node was found, execution continues with step 1507. Otherwise, step 1506 is executed, which updates the found server path node to reflect the detected parent child relationship. This may be performed by updating the thread internal tracing and performance data 1404 of the server side path node 1401 representing the parent thread in a way that it describes the initiation of the thread execution reported by the new created server side path node 1401.

Afterwards, step 1507 inserts the new created server side path node 1401 into the path repository 139 of the monitoring node 133, and the process ends with step 1512.

In case step 1502 determines that the received server side event node describes no new thread execution, the process continues with step 1508. Such a server side event node describes a monitored method execution within a monitored thread execution previously reported by a server side event node describing a new monitored thread execution. Step 1508 queries the path repository 139 for the server side path node 1401 that describes this monitored thread execution. This may e.g. be performed by comparing correlation data identifying the thread that executed the monitored method and the correlation data identifying the process or virtual machine that executed the thread, like e.g. a threadId and the agentId. Subsequent step 1509 checks if a matching server side path node 1401 was found. If no such server side path node 1401 was found, the incoming server side event node is ignored in step 1510 and the process ends with step 1512. If otherwise a matching server side path node 1401 is found, the tread internal tracing and performance data 1404 of the found server side path node is updated to reflect the received tracing and performance data describing the monitored method execution in step 1511 and the process ends with step 1512.

The process shown in FIG. 16 describes the processing of incoming action event nodes 1210 by the browser correlator 137. The process starts with step 1601 when the browser correlator receives an action event node 1210 and continues with 1602 which creates an action path node 1410 for each action performance entry 910 in the action performance data list 1214 of the received action event node. Action origin correlation data 1411 and agentId of each created action path node are set to action origin correlation data and agentId 1413 of the incoming action event node 1210. This identifies the browser instance and content view on which the actions were executed, and the process which received the corresponding action monitor request.

Subsequent step 1603 sets action execution specific data, like actionId 1412, action description data 1414 and action execution performance data 1415 of the created action path node 1410 with data from the corresponding action performance entry 910 in the action performance data list 1214.

Following step 1604 fetches individual third party performance data entries 920 from the individual third party performance data list 914 of action performance entries 910 and creates corresponding individual third party resource path nodes 1430. The created individual third party resource path nodes are added to the individual third party resource path node list 1417 of the corresponding action path node 1410. Third party resourceId 1431 is set to resourceId 922, third party resource type 1432 is set to the resource type 921 and load success indicator 1434 is set to the success flag 925 of the corresponding individual third party data entry 920. Load duration 1433 is set to the value of end timestamp 924 minus start timestamp 923.

Afterwards step 1605 fetches per domain third party performance data entries 930 from the per domain third party performance data list 915 and creates corresponding per domain third party resource data nodes 1420. The domainId 1421 and statistic third party resource load data 1422 are set to the domainId 931 and statistic data 932 of the corresponding per domain third party performance data entry 930. The created per domain third party resource data nodes are added to the per domain third party node list 1416 of the corresponding action path node 1410. Statistic third party resource load data 1422 may contain but is not limited to #of resources loaded from the domain, #of failed loads, min, max and average load time for resources loaded from the domain. Steps 1604 and 1605 are executed for each action performance entry.

Subsequent step 1606 inserts the created action path nodes 1410 into the path repository 139 and the process ends with step 1607.

The process described in FIG. 17 conceptually describes the combination of action path nodes 1410 with those server side path nodes 1401 that describe server side activity caused by the described browser side action executions, as performed by the path combiner 138. The process merges browser side with server side transaction tracing and performance data and creates transaction tracing and performance data that describes end-to-end transactions starting at the browser and ending at the server.

Server correlator 136 and browser correlator 137 work asynchronously and independent, and insert new server side and browser side transaction data into the path repository. The path combiner cyclically (e.g. every second) checks for server side transaction data which matches browser side transaction data which can be combined.

The process starts with step 1701, when the cyclic check time is elapsed. Afterwards, step 1702 queries the path repository for server side path nodes 1401 with set action correlation data 1405 for which no corresponding action path node 1410 has been found yet. If a matching action path node is found, e.g. in a subsequent step, the server side path node may be marked as combined and skipped in future queries.

Subsequent step 1703 is executed for each server side path node found in step 1702 and searches the path repository 139 for action path nodes 1410 with matching action correlation data.

If step 1703 found matching action path nodes, then following step 1704 fetches for each found action path node 1410 those server side path nodes 1401 with matching action correlation data 1405 and adds those matching server side path nodes 1401 to the server side path node list 1418 of the corresponding action path node 1401 and marks those server side path nodes 1401 as combined. It is noteworthy that multiple server side path nodes 1401 may match to one action path node, because one browser side action execution may trigger multiple server side activities. The process ends with step 1705.

The collected data describing third party resource load requests on the granularity level of individual third party load requests performed by individual browsers, combined with geographic location data captured from the individual browsers, and with performance data describing individual browser side action executions and server side activities allows to resolve various analysis tasks. Those analysis tasks provide valuable information that allows identifying the area of the root cause of various performance problems, and also allow identifying if specific performance problems related to the loading of third party resources are restricted to specific geographic locations.

The processes described in FIG. 18 show four exemplary analysis processes that may be performed.

The process depicted in FIG. 18*a* shows how to detect the degree to which loading of third party resources impacts the overall performance as perceived by the end user, related to the performance impact of other activities. The process starts with step 1801, when e.g. the analysis and visualization module 140 of the monitoring node 133 receives a corresponding analysis request. The analysis request may e.g. be triggered by an administrator user responsible for the performance of the monitored application. Subsequent steps 1802 and 1803 calculate overall performance data of all recorded server side and browser side activities. As an example, average, min and max execution times of server side and browser side activities may be calculated. Following step 1804 calculates corresponding overall performance data for all recorded third party load requests, using e.g. per domain third party resource load performance data stored in per domain third party resource path nodes 1420.

Step 1805 returns the calculated performance data for visualization. The performance data may e.g. be used to compare the time spent requesting third party resource with time spent for browser side activities and server side activities. This data may be used to identify, in case of a performance problem, if the root cause of the performance problem is situated on the server, browser or third party resource side. The process ends with step 1806.

The process shown in FIG. 18*b* describes how to filter third party load requests that exceed a certain load time threshold. Such an analysis may e.g. be used to check whether service level agreements (SLAs) with third party resource providers are met. The process starts with step 1810 when the analysis is requested. Subsequent step 1811 queries action path nodes that contain at least one individual third party resource path node 1430 with a load duration 1433 that exceeds the threshold provided with the analysis request. Step 1812 returns the query result and the process ends with step 1813.

FIG. 18*c* describes the processing of an analysis request that creates a list of all domains that provided third party resource, ranked by a specific third party resource load performance parameter. The process starts with step 1820, when the analysis and visualization module 140 receives a corresponding analysis request. The analysis request may also specify the performance parameter which should be used for the ranking. Examples for such performance parameters are average load time, maximal load time, number of failed resource load requests. Step 1821 interprets the request and aggregates the requested statistic value for each individual domain that is available in the per domain third party resource path nodes 1420 stored in the path repository 139, and creates a list that contains the domainIds and the corresponding performance parameter. Subsequent step 1822 sorts the list according to the performance parameter and returns the sorted list. The process ends with step 1823.

FIG. 18*d* describes the processing of an analysis request that provides data describing geography based deviations of performance of a specific domain providing third party resource. The data stored in the path repository 139 contains action path nodes 1410 containing data describing action executions performed by individual browser instances identified by the action origin correlation data 1411. The action origin correlation data may also contain data about the geographic location of the browser instance that performed the described action execution. The data about the geographic location may be extracted by the browser agent 201 and provided as part of the action performance data 115 sent by the browser agent. The geographic location data may e.g. be provided as the IP address of the host that executed the browser. The IP address allows determining the geographic location of the host with sufficient accuracy.

The process starts with step 1830, when the analysis and visualization module 140 receives a corresponding analysis request. The analysis request may contain a domainId that identifies the third party resource providing domain of interest and a desired geographic granularity level like e.g. city, country or continent. Subsequent step 1831 queries the path repository for action path nodes 1410 containing at least one per domain third party resource path node 1420 with a domainId 1421 matching the domainId of interest.

Following step 1832 determines for each found action path node 1410 the geographic location according to the desired granularity level, and creates action path node groups according to the geographic location.

Afterwards, step 1833 may create per geographic location performance data for each action path node group created in the previous step, and then create a list containing all geographic locations detected in the previous step with associated per geographic location performance data. The list may then be sorted according to the value of the performance data of interest (received with the analysis request). Examples of such performance data contain but are not limited to average load time per location, min/max load time per location and number of failed load requests per location. The sorted list may be returned to the caller, and the process ends with step 1834.

The above described analysis tasks are considering the whole content of the path repository 139. Those analysis tasks may also be performed on a subset of the path repository content defined by various filter criteria, like e.g. action executions performed by browsers in a specific geographic location, action executions with a specific actionId, action executions performed within a specific time span, etc.

In addition to those analysis tasks, the data stored in the path repository 139 describing monitored third party requests may be filtered and grouped according to various user defined requirement.

As an example for grouping, individual third party resource path node 1430 or per domain third party resource path nodes 1420 may be grouped according to the content delivery network that provided the resources. Individual content delivery networks may provide resources in multiple domains. As an example, content delivery network cdn1 may provide data for domains cdn1.domain1.com and cdn1.domain2.com. All third party resource load performance monitoring data received from one of those domains may be assigned to the content delivery network cdn1. The determined per content delivery network groups may be presented to the user either in form of statistical data describing the overall performance per content delivery network, or in a set of lists of individual and per domain third party resource nodes per content delivery network.

One example for filtering third party load monitoring data is the suppression of browser plugin caused resource load requests. Some browser plugins automatically perform tasks not related to the monitored application with browser side action executions. Third party resource requests performed by such plugins unnecessarily bloat the monitoring data with irrelevant data. It is desired to suppress such performance monitoring data which is obviously not related to the performance of the monitored application. Such unwanted monitoring data may be suppressed by defining blacklists identifying resources that should be suppressed or whitelists defining resources which should be visualized. Those blacklists and whitelists may either be interpreted by the analysis and visualization module 140 on processing/displaying tracing and monitoring data from the path repository, or they may be transferred to the browser agent 210 which suppresses the creation of undesired monitoring data according to those whitelists and blacklists.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for monitoring performance of an application being executed by a web browser residing on a computing device and rendering content received from a web server, comprising:
    detecting, by a sensor, a user interaction with the web browser and a content update request caused by the user interaction, where the sensor is instrumented in the content displayed by the web browser and executed by a processor of the computing device;
    sending, by the sensor, an update notification to a browser agent in response to detecting the user interaction and the content update request caused by the user interaction, where the update notification indicates a possible update to a document object model which represents content displayed by the web browser;
    receiving, by the browser agent, the update notification pertaining to the document object model, where the browser agent is injected into the content displayed by the web browser and executed by the processor of the computing device;
    periodically determining, by the browser agent, whether an update of the document object model has occurred, the determination being performed in response to receiving the update notification pertaining to the document object model;
    identifying, by the browser agent, elements added to the document object model according to the update notification, where the identified elements contain resource load directives which are serviced by data source other than the web server and were not previously instrumented; and
    instrumenting, by the browser agent, an identified element with a resource sensor, where the resource sensor is comprised of instructions that are executed by the processor upon occurrence of a resource load event and generates an event message regarding the resource load event associated with the identified element.

2. The method of claim 1 wherein the update notification pertaining to a document object model corresponding to a change of the content currently displayed by the web browser, where the change is caused by browser side execution of content update commands.

3. The method of claim 1 wherein identifying elements in the document object model further comprises searching for elements having tags indicative of an image or a script;
    parsing the tags to identify a resource location;
    comparing the resource location to an address for the web server; and
    instrumenting the elements having tags indicative of an image or a script, where the corresponding resource location differs from the address for the web server.

4. The method of claim 1 further comprises
    capturing, by a browser agent, a first action event indicative of a user interaction with the web browser;
    capturing, by the browser agent, a second action event indicative of a resource load request from a data source other than the web server;
    associating, by the browser agent, the second action event with the first action event; and
    creating, by the browser agent, an action monitor request for the user interaction, where the action monitor request includes an identifier for the user interaction and at least one performance metric pertaining to the resource load request.

5. The method of claim 4 further comprises
    determining, by the browser agent, whether the resource load request is caused by the user interaction; and
    associating, by the browser agent, the second action event with the first action event only when the resource load request is caused by the user interaction.

6. The method of claim 4 further comprises determining, by the browser agent, a load time for the resource load request using data contained in the second action event.

7. The method of claim 4 further comprises retrieving, by the browser agent, a load time for the resource load request from a data repository of timing information related to HTML elements.

8. The method of claim 4 further comprises maintaining, by the browser agent, a list of on-premise web servers which should not be considered as third party resources and determining, by the browser agent, whether the second action event is indicative of a third party request using the list of on-premise web servers.

9. The method of claim 4 wherein the action monitor request includes a start timestamp indicating an occurrence of the user interaction and an end timestamp indicating an end time of the resource load caused by the user interaction.

10. The method of claim 9 further comprises
    capturing, by the browser agent, a third action event indicative of a second resource load request from a data source other than the web server; and
    updating the end timestamp in the action monitor request with a timestamp from either the second action event or the third action event, where the timestamp indicates an end time for the resource load and is the later of the timestamps provided in the second action event and the third action event.

11. The method of claim 4 further comprises
    creating, by the browser agent, a third party record for each identified element instrumented with a resource sensor;
    determining the performance metric pertaining to the resource load request from the second action event; and
    sending, by the browser agent, the action monitor request over a data network to a monitor computing device located remotely from the computing device.

12. The method of claim 11 further comprises
    grouping, by the browser agent, the third party records by domain servicing the corresponding resource load request; and calculating, by the browser agent, statistical data for resource load request performance for a given domain from the group of third party records corresponding to the given domain.

13. The method of claim 4 further comprises creating, by the browser agent, a third party record for each identified element instrumented with a resource sensor;

determining the performance metric pertaining to the resource load request from the second action event;

selecting, by the browser agent, a subset of the third party records for inclusion in the action monitor request; and sending, by the browser agent, the action monitor request over a data network to a monitor computing device located remotely from the computing device.

14. The method of claim 4 further comprises receiving, by a monitor computing device, the action monitor request, the monitor computing device located remotely from the computing device running the web browser;

calculating, by the monitor computing device, statistical data for browser side activities from data contained in the action monitor request;

calculating, by the monitor computing device, statistical data for resource load requests from data contained in the action monitor request; and presenting, by the monitor computing device, the statistical data for the browser side activities and the resource load requests for comparison.

15. The method of claim 4 further comprises capturing, by the browser agent, an indicator of geographic location for the computing device running the web browser;

sending, by the browser agent, the action monitor request over a data network to a monitor computing device located remotely from the computing device, where the action monitor request includes the indicator of geographic location; and reporting, by the monitor computing device, on resource load requests using the indicator of geographic location retrieved from the action monitor request.

16. A computer-implemented method for monitoring performance of an application executed by a web browser residing on a computing device and rendering content received from a web server, comprising:

capturing, by a browser agent, a first action event indicative of a user interaction with the web browser, where the browser agent is executed by a processor of the computing device;

capturing, by the browser agent, a second action event indicative of a content update request which can cause an update to a document object model representing the content displayed by the web browser, where the update notification indicates an update to a portion of the content displayed by the web browser, where the update occurs in one content view and without updating all of the content displayed by the web browser;

receiving, by the browser agent, an update notification pertaining to the document object model;

periodically determining, by the browser agent, whether an update of the document object model has occurred, the determination being performed in response to receiving the update notification;

identifying, by the browser agent, elements in the document object model that contain resource load directives, where the resource load directives are serviced by data sources other than the web server;

instrumenting, by the browser agent, an identified element with a resource sensor, where the resource sensor generates an event message regarding a resource load event associated with the identified element;

capturing, by the browser agent, a third action event indicative of a resource load request from a data source other than the web server;

associating, by the browser agent, the second action event and the third event with the first action event;

creating, by the browser agent, an action monitor request for the user interaction, where the action monitor request includes an identifier for the user interaction and at least one performance metric pertaining to the resource load request.

17. The method of claim 16 further comprises determining, by the browser agent, whether the resource load request is caused by the user interaction; and associating, by the browser agent, the second action event with the first action event only when the resource load request is caused by the user interaction.

18. The method of claim 16 further comprises determining, by the browser agent, a load time for the resource load request using data contained in the second action event.

19. The method of claim 16 further comprises determining, by the browser agent, whether the requested resource was loaded successfully.

20. The method of claim 16 further comprises retrieving, by the browser agent, a load time for the resource load request from a data repository of timing information related to HTML elements.

21. The method of claim 16 further comprises maintaining, by the browser agent, a list of on-premise web servers which should not be considered as third party resources and determining, by the browser agent, whether the third action event is indicative of a third party request using the list of on-premise web servers.

22. The method of claim 16 wherein the action monitor request includes a start timestamp indicating an occurrence of the user interaction and an end timestamp indicating an end time for the resource load caused by the user interaction.

23. The method of claim 16 further comprises creating, by the browser agent, a third party record for each identified element instrumented with a resource sensor;

determining the performance metric pertaining to the resource load request from the third action event; and sending, by the browser agent, the action monitor request over a data network to a monitor computing device located remotely from the computing device.

24. The method of claim 23 further comprises grouping, by the browser agent, the third party records by domain servicing the corresponding resource load request; and calculating, by the browser agent, statistical data for resource load requests for a given domain from the group of third party records corresponding to the given domain.

25. The method of claim 16 further comprises creating, by the browser agent, a third party record for each identified element instrumented with a resource sensor;

determining the performance metric pertaining to the resource load request from the second action event;

selecting, by the browser agent, a subset of the third party records for inclusion in the action monitor request; and sending, by the browser agent, the action monitor request over a data network to a monitor computing device located remotely from the computing device.

26. The method of claim 16 further comprises
receiving, by a monitor computing device, the action monitor request, the monitor computing device located remotely from the computing device;
calculating, by the monitor computing device, statistical data for browser side activities from data contained in the action monitor request;
calculating, by the monitor computing device, statistical data for resource load requests from data contained in the action monitor request; and
presenting, by the monitor computing device, the statistical data for the browser side activities and the resource load requests for comparison.

27. The method of claim 16 further comprises
capturing, by the browser agent, an indicator of geographic location for the computing device;
sending, by the browser agent, the action monitor request over a data network to a monitor computing device located remotely from the computing device, where the action monitor request includes the indicator of geographic location; and
reporting, by the monitor computing device, on resource load requests using the indicator of geographic location retrieved from the action monitor request.

28. The method of claim 16 wherein the action monitor request includes an identifier for a resource load associated with the resource load request.

29. A performance management system that measures end user performance in a distributed computing environment, comprising:
a web browser executed by a processor on a client computing device that renders content received from a web server;
a first sensor instrumented in the content displayed by the web browser and executed by a processor of the client computing device, the first sensor configured to detect a user interaction with the web browser and a content update request caused by the user interaction, and, in response to detecting the user interaction and the content update request caused by the user interaction, send an update notification to a browser agent, where the update notification indicates a possible update to a document object model which represents content displayed by the web browser; and
the browser agent executing on the processor of the client computing device, the browser agent includes:
an instrumentation manager executed by a processor and configured to receive the update notification from the first sensor and, in response to receiving the update notification, determining whether an update of the document model has occurred and identify elements in the document object model that contain resource load directives, where the update notification indicates an update to a portion of the content displayed by the web browser without updating all of the content displayed by the web browser and the resource load directives are serviced by data sources other than the web server,
the instrumentation manager further operates to create a third party record for each resource load directive and to instrument an identified element with a resource sensor, where the resource sensor is comprised of instructions that are executed by the processor upon occurrence of a resource load event and generates an event message when resource loading is finished; and
a resource manager executed by a processor and configured to receive event messages from the resource sensors and operable to identify a third party record corresponding to the received event messages and to update the identified third party record using data contained in the received event messages.

30. The performance management system of claim 29 wherein the event messages from the resource sensors include a timestamp that provides a time at which loading of the resource was finished and an indicator as to whether the loading of the resource was successful.

31. The performance management system of claim 29 wherein the instrumentation manager detects an update by identifying requests that potentially update the document object model; and periodically determines, whether an update of the document object model has occurred, the determination being performed in response to the identification of one or more requests that potentially update the document object model.

32. The performance management system of claim 29 wherein the instrumentation manager reports the third party records caused by user interaction.

33. The performance management system of claim 29 wherein the instrumentation manager operates to create a third part record and instrument an identified element with a resource sensor when the update of the document object model is caused by user interaction.

34. The performance management system of claim 29 wherein the browser agent further includes
an action data manager configured to receive an action event indicative of a user interaction with the web browser and operates, in response to receiving the action event, to create an action record for the user interaction, where the action record includes an identifier for the user interaction;
an action monitor request sender operates to associate one or more third party records with the action record, create an action monitor request and send the action monitor request over a data network to a monitor computing device located remotely from the client computing device, where the action monitor request includes data from the action record and the third party records.

35. The performance management system of claim 34 further comprises
an update request handling method configured, at the web server, to receive content update requests from the web browser, create a request record for each content update request and send the request record over a data network to the monitor computing device; and
an event correlator executing on the monitor computing device, the event correlator configured to receive the action monitor request and the request record and operate to associate the action monitor request with the corresponding request record.

* * * * *